(12) United States Patent
Shimazaki et al.

(10) Patent No.: US 7,257,486 B2
(45) Date of Patent: Aug. 14, 2007

(54) PARKING ASSISTING DEVICE

(75) Inventors: Kazunori Shimazaki, Aichi-ken (JP);
Tomio Kimura, Aichi-ken (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 211 days.

(21) Appl. No.: 10/733,497

(22) Filed: Dec. 10, 2003

(65) Prior Publication Data
US 2004/0153243 A1 Aug. 5, 2004

(30) Foreign Application Priority Data
Jan. 29, 2003 (JP) ............................. 2003-019872
Feb. 10, 2003 (JP) ............................. 2003-032656

(51) Int. Cl.
*G05D 1/02* (2006.01)
(52) U.S. Cl. .................... 701/300; 701/1; 382/103; 340/932.2; 348/113
(58) Field of Classification Search ............... 701/300, 701/1; 382/103; 340/932.2; 180/199; 348/113, 348/118
See application file for complete search history.

(56) References Cited

U.S. PATENT DOCUMENTS

| | | | |
|---|---|---|---|
| 6,463,363 B1 * | 10/2002 | Okuda | 701/1 |
| 6,593,960 B1 * | 7/2003 | Sugimoto et al. | 348/148 |
| 6,704,653 B2 * | 3/2004 | Kuriya et al. | 701/301 |
| 6,950,035 B2 * | 9/2005 | Tanaka et al. | 340/932.2 |
| 2003/0045973 A1 * | 3/2003 | Okamoto | 701/1 |
| 2003/0080877 A1 * | 5/2003 | Takagi et al. | 340/932.2 |

FOREIGN PATENT DOCUMENTS

| | | |
|---|---|---|
| EP | 1 123 844 A1 | 8/2001 |
| EP | 1123844 A1 * | 8/2001 |
| EP | 1 199 225 A1 | 4/2002 |
| JP | 10-244891 | 9/1998 |
| JP | 2001-180407 | 7/2001 |
| JP | 2001-322520 | 11/2001 |

* cited by examiner

*Primary Examiner*—Thomas Black
*Assistant Examiner*—Marie A Weiskopf
(74) *Attorney, Agent, or Firm*—Morgan & Finnegan, L.L.P.

(57) ABSTRACT

A parking assisting device including an image capturing unit for capturing at least an image behind the vehicle, a monitor for displaying the image obtained by the image capturing unit, a yaw angle detecting unit for detecting a yaw angle of the vehicle, a guiding unit for outputting guidance information to the driver and a controller for comparing a prescribed yaw angle corresponding to a predetermined vehicle position with the yaw angle of the vehicle detected by the yaw angle detecting unit, to identify a current position of the vehicle, and providing guidance information via the guiding unit while displaying at least one of a predicted path and a predicted parking position on the monitor so as to overlap with the image obtained by the image capturing unit to enable the driver to confirm whether the vehicle can be parked in target parking space.

15 Claims, 16 Drawing Sheets

PARKING ASSISTING DEVICE

BACKGROUND OF THE INVENTION

1. Field of the Invention

The present invention relates to a parking assisting device, and more particularly to a device for informing a driver of driving operations upon parking.

2. Description of the Related Art

In a conventional parking assisting device, for example, as disclosed in JP 2001-322520 A, a yaw rate sensor or the like is used to detect a yaw angle of a vehicle, a turning angle for the vehicle is calculated, and guidance information relating to an operation method and operation timing in each step of reverse parking is outputted from a speaker.

According to this type of parking assisting device, the driver can guide the vehicle mounted with the device to the parking space simply by performing driving operations of the vehicle in accordance with the guidance information outputted from the speaker as a voice.

However, regarding the fact that when the driving operations cannot be performed exactly in accordance with the guidance information such as when obstructions are present in the path to the parking space, or when the driver commits an error in the driving operations, there are cases where the vehicle cannot be parked in the target parking space even if the driving operations are continued, it was difficult to confirm such situation in advance simply by performing the operations in accordance with the guidance information from the speaker. Therefore, there was a possibility that even when the vehicle has been brought close to the parking space, the driver could not park the vehicle and would have to repeat the driving operations for parking from the beginning.

SUMMARY OF THE INVENTION

The present invention has been made to solve the above-mentioned problems, and therefore has an object to provide a parking assisting device enabling advance confirmation of whether or not the vehicle can be parked into a parking space by performing driving operations in accordance with guidance information.

It is a further object of the present invention to provide a parking assisting device in which, even when the vehicle cannot be parked into a target parking space in a current state, it is still possible to park the vehicle without moving it from the position where it is currently stopped, i.e. without repeating the driving operations from the beginning.

According to the present invention, there is provided a parking assisting device with which a driver parks a vehicle into a target parking space by performing driving operations in accordance with guidance information, the device including: image capturing means for capturing at least an image behind the vehicle; a monitor arranged near a driver seat of the vehicle for displaying the image obtained by the image capturing means; yaw angle detecting means for detecting a yaw angle of the vehicle; guiding means for outputting the guidance information regarding the driving operations to the driver; and a controller for comparing a prescribed yaw angle corresponding to a predetermined vehicle position with the yaw angle of the vehicle detected by the yaw angle detecting means, to identify a current position of the vehicle, and providing the guidance information via the guiding means while displaying at least one of a predicted path and a predicted parking position on the monitor so as to overlap with the image obtained by the image capturing means to enable the driver to confirm whether or not the vehicle can be parked into the target parking space by continuing the driving operations in accordance with the guidance information.

DETAILED DESCRIPTION OF THE PREFERRED EMBODIMENTS

Hereinafter, embodiments of the present invention are explained based on the attached drawings.

Embodiment 1

Figure 1:
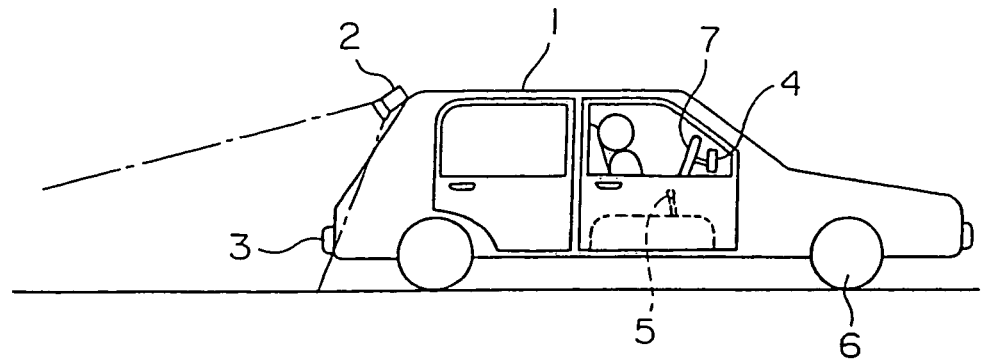
FIG. 1 is a side view of a vehicle mounted with a parking assisting device in accordance with an embodiment of the present invention.

As shown in FIG. 1, a rear view camera 2 is mounted to the back of a vehicle 1 as an image capturing means for capturing images of a view behind the vehicle 1. A rear bumper 3 of the vehicle 1 comes within a lower end portion of the visual range of the camera 2. A monitor 4 constituted of a color-type liquid crystal display is arranged near a driver seat of the vehicle. The monitor 4 is normally used as a display device of a navigation system. However, when parking assistance operations according to the present invention are being performed, the monitor 4 displays images taken by the camera 2. Further, a shift lever 5 is arranged to one side of the driver seat. Front wheels 6, which are wheels that steer the vehicle, are steered by operations with a steering wheel 7.

Figure 2:
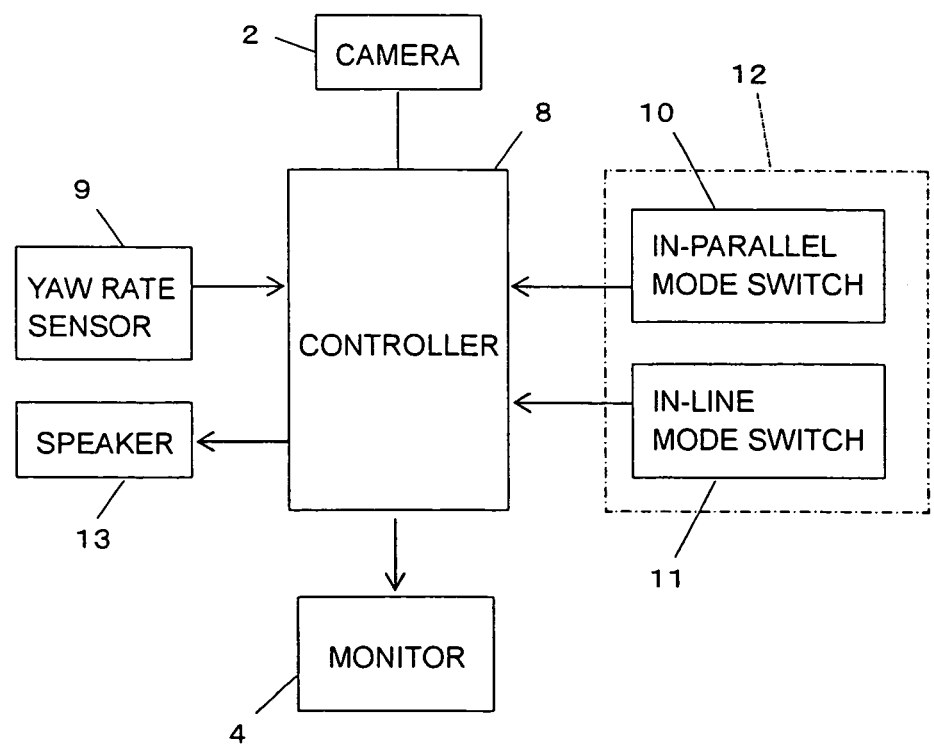
FIG. 2 is a block diagram showing a construction of a parking assisting device in accordance with Embodiment 1.

FIG. 2 shows a structure of a parking assisting device according to Embodiment 1 of the present invention. A controller 8 is connected to the camera 2 and the monitor 4. Connected to the controller 8 are: a yaw rate sensor 9 for detecting angular speed of the yaw angle direction of the vehicle 1; and a switch module 12 having an in-parallel mode switch 10 for informing the controller 8 that the vehicle 1 performs in-parallel parking and an in-line mode switch 11 for informing the controller 8 that the vehicle 1 performs in-line parking. Further, a speaker 13 for providing driving operation information to a driver is connected to the controller 8.

Although not shown in the diagram, the controller 8 includes a CPU, a ROM storing control programs, and a RAM used for performing operations.

The ROM stores a minimum turning radius Rc data used when the steering wheel 7 of the vehicle 1 is turned to its maximum and the vehicle 1 turns, and also stores control programs for performing parking assistance upon in-parallel parking and in-line parking. The CPU operates based on the control programs stored in the ROM. The controller 8 calculates a yaw angle of the vehicle 1 from an angle speed of the vehicle 1 inputted from the yaw rate sensor 9, and calculates a turning angle of the vehicle 1, and then outputs to a speaker 13 operation methods and operation timing of each step to park the vehicle.

Figure 3A:
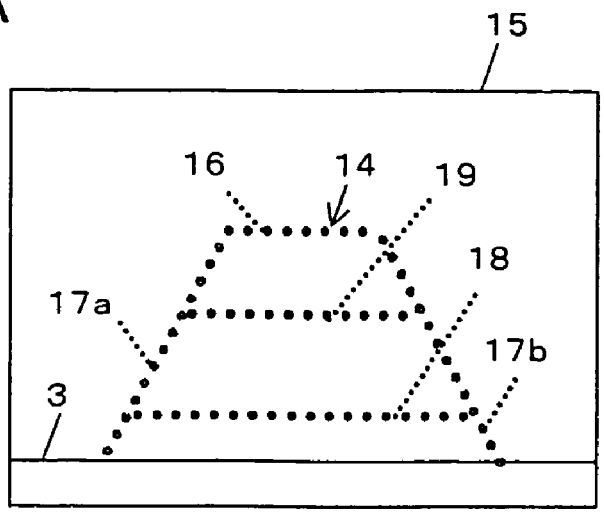
FIGS. 3A to 3C are diagrams showing schematically and stepwise screens of a monitor of when performing parking assistance in accordance with Embodiment 1.
Figure 3B:
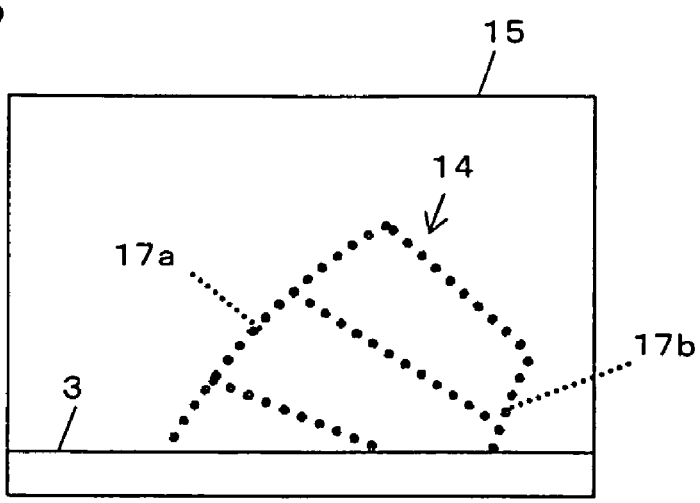
Figure 3C:
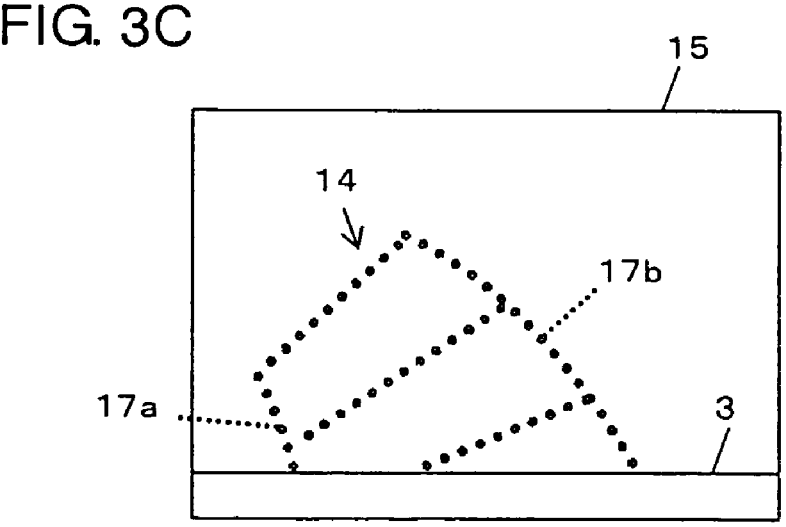

The controller 8 displays the rear view image captured by the camera 2 on the monitor 4, along with overlapping display of a predicted path 14 for the vehicle 1, shown by the dotted lines in FIGS. 3A to 3C. FIG. 3A shows the predicted path 14 when the vehicle moves straight backward. FIG. 3B shows the predicted path 14 when moving backward with the steering angle at the maximum rightward. FIG. 3C shows the predicted path 14 when moving backward with the steering angle at the maximum leftward. The predicted paths 14 have a sideline 17a and a sideline 17b on a screen 15 of the monitor 4. For example, the sidelines 17a and 17b connect line segments 18, 19, and 16, which are equivalent to a width of 1.8 m created by connecting both ends of the rear bumper 3, advancing from the rear bumper 3 of the vehicle 1 by 0.5 m, 1.5 m and 3 m from the current position of the rear axle center. The sidelines 17a and 17b connect both ends of the line segments, and extend as straight lines toward the rear bumper 3, or as smoothly curved lines. The predicted path 14 displayed on the monitor 4 becomes the shape extending straight behind the rear bumper 3 as shown in FIG. 3A when moving backward with the steering wheel 7 in the straight state. When moving backward with the steering wheel 7 turned to the maximum rightward to turn as much as possible, or when moving backward with the steering wheel 7 turned to the maximum leftward to turn as much as possible, the predicted path 14 becomes the shape curved to the rightward direction or to the leftward direction as shown in FIG. 3B and FIG. 3C, respectively.

Here, operations of how the parking assisting device assists in the advancing of vehicle 1 during parking in accordance with this embodiment will be described.

Firstly, a case where in-line parking is performed will be described with reference to FIG. 4.

It is assumed that the vehicle 1 is parked in the parking space T so that a rear left end of the vehicle 1 coincides with a corner S2 in the back of the parking space T. A rear axle center MO of the vehicle 1 in a vehicle position M1 in this state is assumed to be an origin, and a Y axis is taken in a direction parallel with a road, which is the backward direction of the vehicle 1, and an X axis is taken to be perpendicular to the Y axis. In addition, coordinates at the corner in the back of the parking space T are assumed to be S2 (W2/2, a). Here, "a" and "W2" denote a rear overhang and a vehicle width of the vehicle 1, respectively.

It is assumed that the vehicle 1 in a vehicle position J1 advances while turning at the minimum turning radius Rc with the steering angle of the steering wheel 7 at the maximum rightward. The vehicle 1 stops when it reaches a vehicle position K1, and moves backward while turning at the minimum turning radius Rc with the steering angle at the maximum leftward. Then, when the vehicle reaches a vehicle position L1, it stops and moves backward while turning at the minimum turning radius Rc with the steering angle at the maximum rightward, until it is appropriately parked in the vehicle position M1 within the parking space T.

First, it is assumed that in-line parking is started with a vehicle 20 parked in a predetermined position in front of the parking space T as a mark and a state in which the vehicle 1 is parked in the vehicle position J1 as an initial stop position.

The vehicle position J1 is assumed to be a position where a Y coordinate of a position DR of a driver of the vehicle 1 coincides with the Y coordinate of a rear end 20a of the parked vehicle 20, which is a position in parallel with the parking space T, and a position where the vehicle 1 and the vehicle 20 are shifted from each other by a predetermined distance d. Therefore, coordinates (JOx, JOy) of a rear axle center JO of the vehicle position J1 are unambiguously defined from the relation between the coordinates of the rear end 20a of the vehicle 20, the position DR of the driver, and the rear axle center JO, and from the vehicle distance d.

The vehicle 1 in the vehicle position J1 advances to the vehicle position K1 while turning at the minimum turning radius Rc with the steering angle of the steering wheel 7 at the maximum rightward. In this case, a turning center is assumed to be C3 and a turning angle is assumed to be β. In addition, the vehicle 1 in the vehicle position K1 moves backward to the vehicle position L1 while turning at the minimum turning radius Rc with the steering angle at the maximum leftward. In this case, a turning center is assumed to be C4 and a turning angle is assumed to be δ. Moreover, the steering wheel 7 is turned in the opposite direction in the vehicle position L1 and the vehicle 1 moves backward to the vehicle position M1 while turning at the minimum turning radius Rc with the steering angle at the maximum rightward.

In this case, a turning center is assumed to be C5 and a turning angle is assumed to be α.

In addition, rear axle centers in the vehicle positions K1 and L1 are assumed to be KO and LO, respectively.

The turning angles α, β and δ have the following relationship:

$$\delta = \alpha - \beta.$$

Coordinates (C5x, C5y) of the turning center C5 are represented by the following expressions:

C5x=−Rc

C5y=0

Coordinates (C4x, C4y) of the turning center C4 are represented by the following expressions:

$$C4x = C5x + (Rc+Rc)\cdot\cos\alpha = -Rc + 2Rc\cdot\cos\alpha$$

$$C4y = C5y - (Rc+Rc)\cdot\sin\alpha = -2Rc\cdot\sin\alpha$$

Coordinates (C3x, C3y) of the turning center C3 are represented by the following expressions:

$$C3x = C4x - (Rc+Rc)\cdot\cos\beta = -Rc + 2Rc\cdot\cos\alpha - 2Rc\cdot\cos\beta$$

$$C3y = C4y - (Rc+Rc)\cdot\sin\beta = -2Rc\sin\alpha + 2Rc\cdot\sin\beta$$

In addition, coordinates (JOx, JOy) of the rear axle center J0 of the vehicle position J1 are represented by the following expressions:

$$JOx = -Rc\cdot(1-\cos\alpha) - Rc\cdot(1-\cos\alpha - 1 + \cos\beta) + Rc\cdot(1-\cos\beta)$$
$$= 2Rc\cdot(\cos\alpha - \cos\beta)$$

$$JOy = -Rc\cdot\sin\alpha - Rc\cdot(\sin\alpha - \sin\beta) + Rc\cdot\sin\beta$$
$$= 2Rc\cdot(\sin\beta - \sin\alpha)$$

Here, when the above expressions (1) and (2) are transformed using a formula of the trigonometric functions, the following expressions are obtained:

$$\tan(\alpha/2 + \beta/2) = JOx/JOy$$

$$\sin^2(\alpha/2 - \beta/2) = (JOx^2 + JOy^2)/(16Rc^2)$$

α and β can be calculated using the coordinates (JOx, JOy) of the rear axle center JO.

The coordinates (JOx, JOy) of the rear axle center JO use, for example, the values of JOx=−2.3 m and JOy=−4.5 m as standard values for allowing the driver to park the vehicle 1 behind the vehicle 20 by a natural operation.

It is desirable to set the standard values of the coordinates JOx and JOy of the rear axle center JO according to grade, steering property and the like of the vehicle 1.

Figure 5:
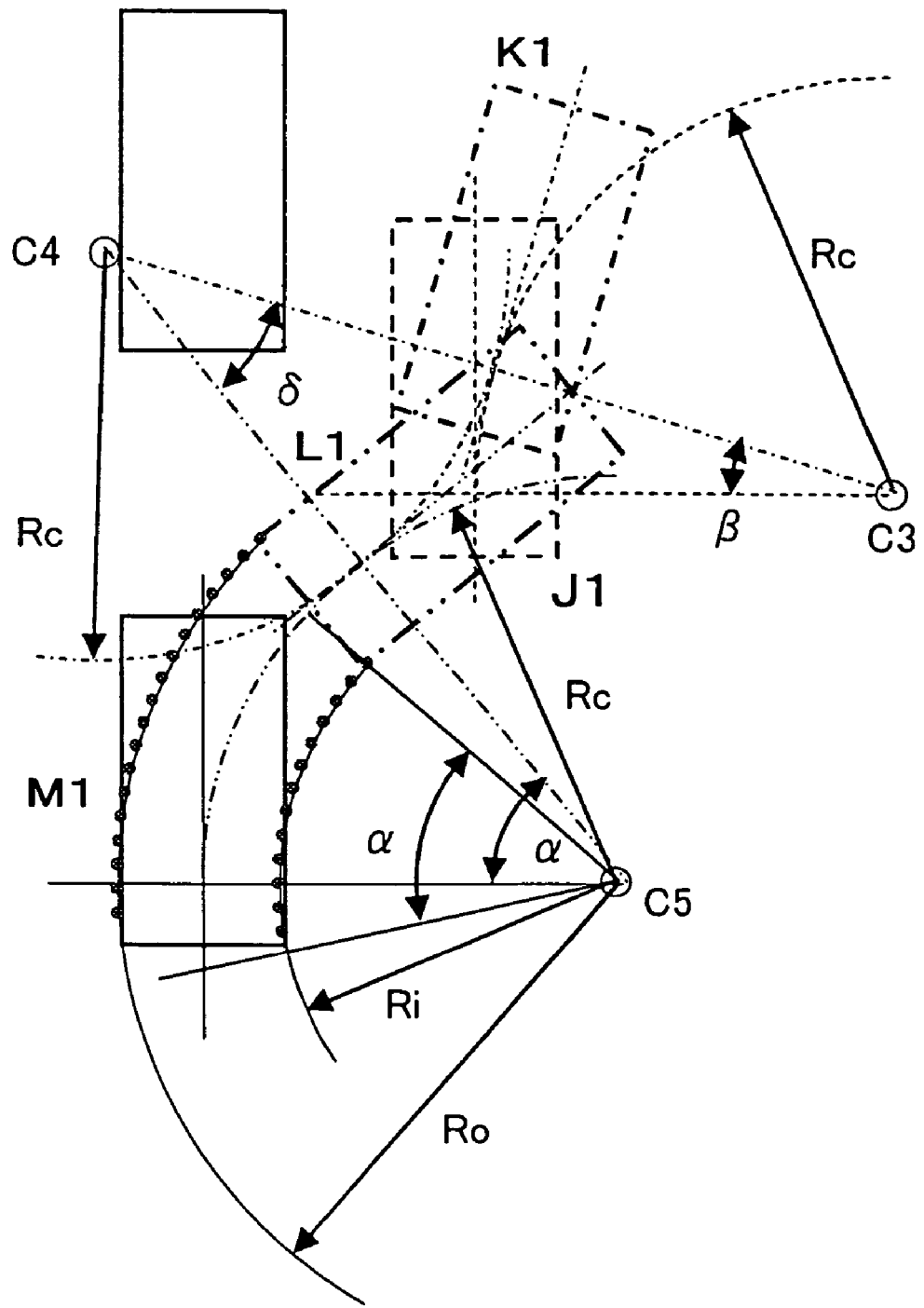
FIG. 5 is a diagram showing schematically and stepwise a path of the vehicle when performing in-line parking in accordance with Embodiment 1.

Next, as shown in FIG. 5, when the vehicle 1 is positioned at the vehicle position L1, the steering wheel 7 is turned to the maximum right and the vehicle turns and moves backwards, to arrive at the vehicle position M1. Explanation is given regarding the way to draw the predicted path in this case. It is assumed that the radius of the rear-right end and the rear-left end of the vehicle 1 from the turning center C5 are Ri and Ro, respectively.

Figure 6:
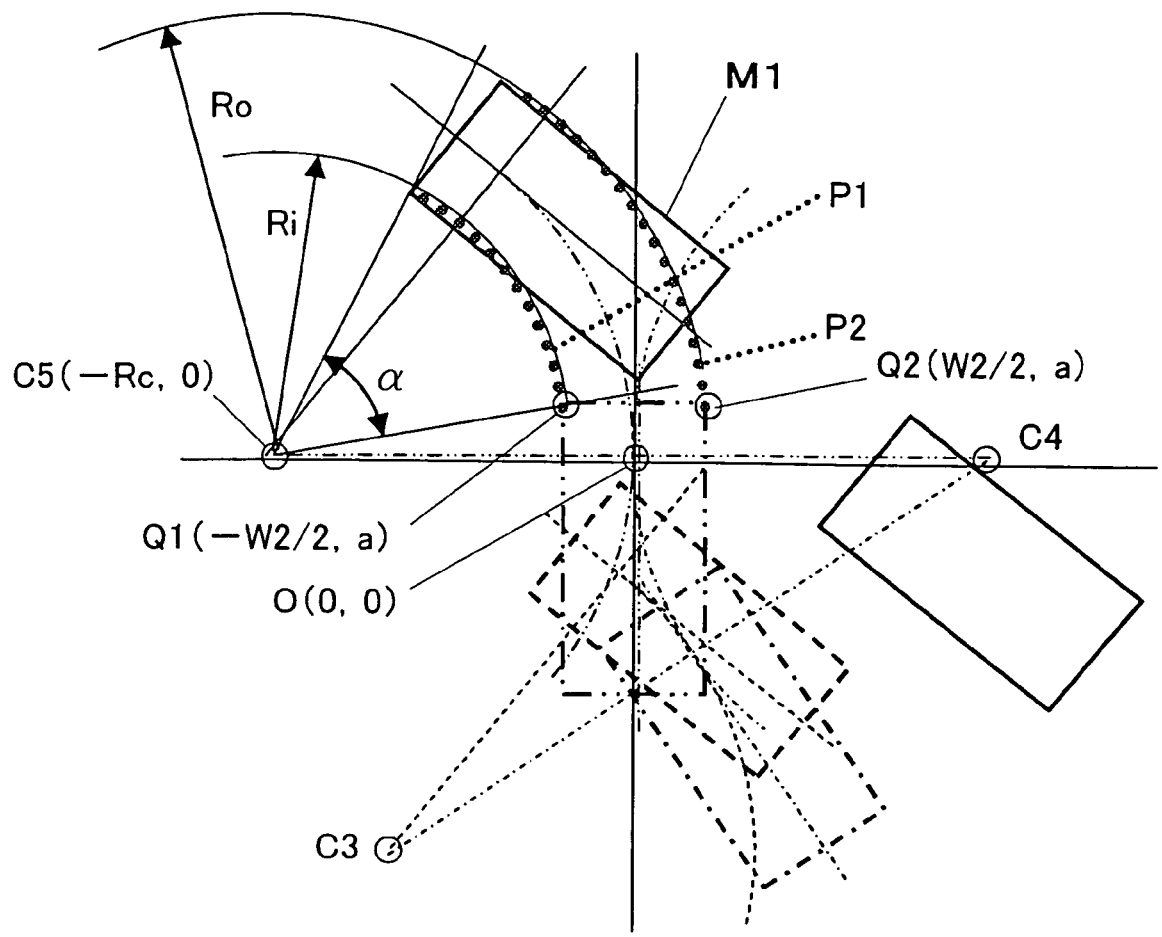
FIG. 6 is a diagram showing how a predicted path of a vehicle is plotted when performing in-line parking in accordance with Embodiment 1.

Here, as shown in FIG. 6, with the vehicle 1 at the vehicle position L1, the rear axle center position is set as a point of origin 0, and a Y-axis is taken along the length direction of the vehicle 1 at the vehicle position L1, and an X-axis is taken perpendicular to the Y-axis. With the vehicle 1 located at the vehicle position L1, coordinates of a rear-right end Q1 are (−W2/2, a), coordinates of a rear-left end Q2 are (W2/2, a), and coordinates of the turning center C5 are (−Rc, 0).

Further, the turning radius Ri of the rear-right end and the turning radius of the rear-left end Ro are expressed as:

$$Ri = \{(Rc - W2/2)^2 + a^2\}^{1/2}$$

$$Ro = \{(Rc + W2/2)^2 + a^2\}^{1/2}$$

Here, the path of the rear-right end Q1 of the vehicle 1 is defined as P1, and the path of the rear-left end Q2 is defined as P2. The path P1 is plotted as an arc having a turning angle α and a radius of Ri from the point Q1 (−W2/2, a), with the turning center C5 (−Rc, 0) as its center. On the other hand, the path P2 is plotted as an arc having a turning angle α and a radius of Ro from the point Q2 (W2/2, a), with the turning center C5 (−Rc, 0) as its center.

When these paths P1 and P2 are actually displayed on the monitor 4 as the paths when the vehicle 1 is located at the vehicle position L1, the path P1 corresponds to the sideline 17b of the predicted path 14 shown in FIG. 3B, and the path P2 corresponds to the sideline 17a.

Next, an operation of the parking assisting device in accordance with this embodiment at the time of in-line parking will be described.

Figure 4:
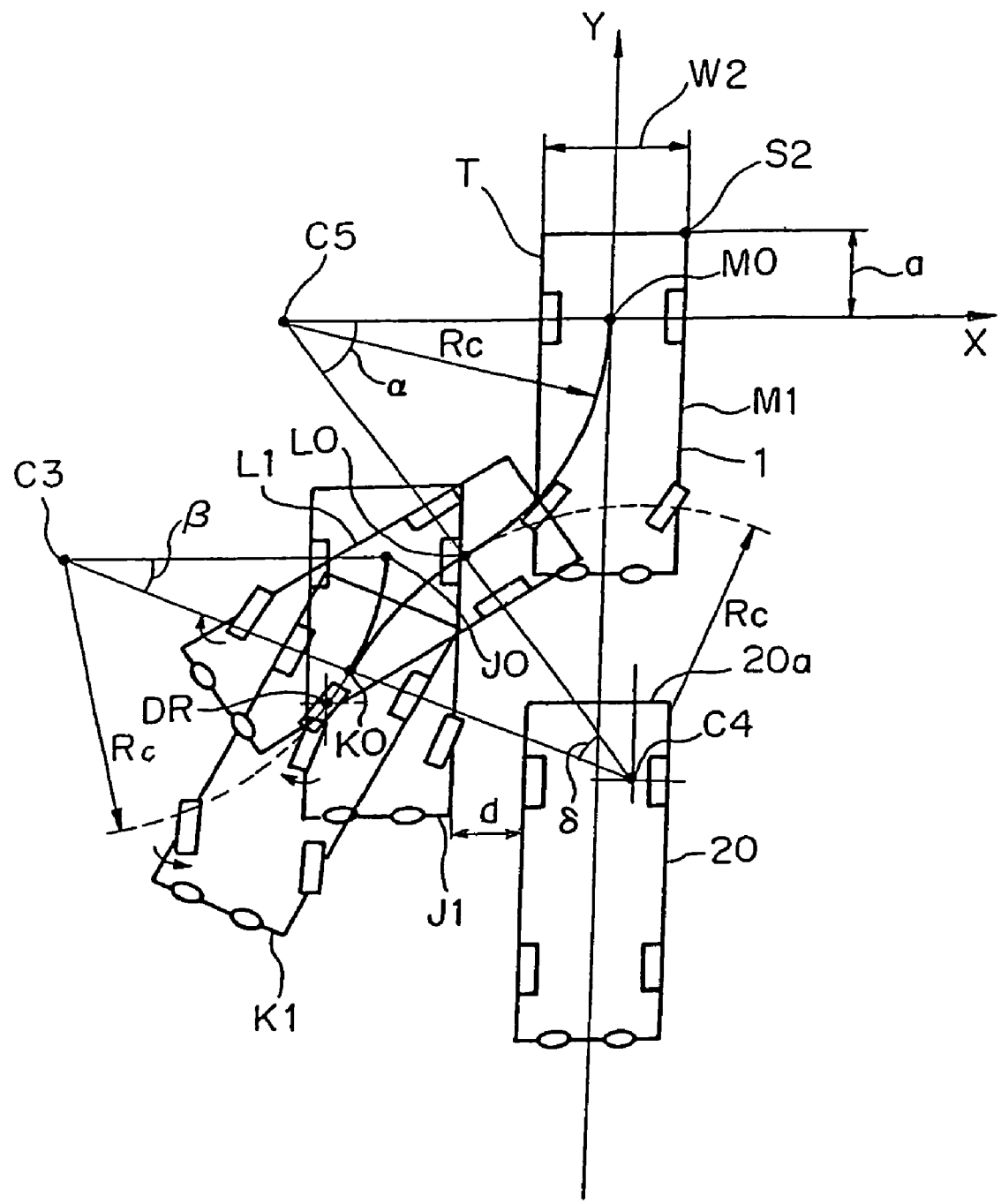
FIG. 4 is a diagram showing schematically and stepwise positions of the vehicle when performing in-line parking in accordance with Embodiment 1.

First, in FIG. 4, the driver stops the vehicle 1 in the vehicle position J1 so that a Y coordinate of the position DR of the driver coincides with a Y coordinate of the rear end 20a of the parked vehicle 20 and the vehicle 1 is shifted from the vehicle 20 by the vehicle distance d, for example, 50 cm. When the in-line mode switch 11 is actuated at this point, the controller 8 sets the vehicle position J1 as a position where a yaw angle of the vehicle is zero degree and simultaneously activates a program for in-line parking. The driver steers the steering wheel 7 of the vehicle 1 to the maximum rightward to bring it to a fully turned state and advances the vehicle 1 in that state. The controller 8 calculates a yaw angle of the vehicle from an angular speed of the vehicle 1 inputted from the yaw rate sensor 9 and compares the yaw angle with the value of the turning angle β (the pre-set prescribed yaw angle). As the vehicle 1 approaches the vehicle position K1 from the vehicle position J1, the controller 8 provides to the driver an approach information to notify that the vehicle has approached the vehicle position K1 and an arrival information to notify that the vehicle has reached the vehicle position K1, based on the difference between the yaw angle and the turning angle β via the speaker 13.

For example, an intermittent sound such as "blip, blip" is emitted from the speaker 13 as the approach information, and the cycle of this intermittent sound and blinking becomes shorter as the difference between the yaw angle and the turning angle β decreases. When the difference between the yaw angle and the turning angle β is eliminated, a continuous sound such as "bleep" is emitted from the speaker 13 as the arrival information.

The driver stops the vehicle 1 in the vehicle position K1 in accordance with the arrival information. Next, the driver steers the steering wheel 7 to the maximum leftward and moves the vehicle 1 backward. At this time, the screen 15 of the monitor 4 switches to show the picture shot by camera 2 from the back of vehicle 1. The controller 8 compares the yaw angle of the vehicle 1 and a value of the turning angle α (=β+δ) (the pre-set prescribed yaw angle). As the vehicle 1 approaches the vehicle position L1 from the vehicle position K1, that is, as the yaw angle of the vehicle approaches the value of the turning angle α, the controller 8 provides to the driver an approach information to notify that the vehicle has approached the vehicle position L1 and an arrival information to notify that the vehicle has reached the vehicle position L1 based on the difference between the yaw angle and the turning angle α via the speaker 13.

Figure 7A:
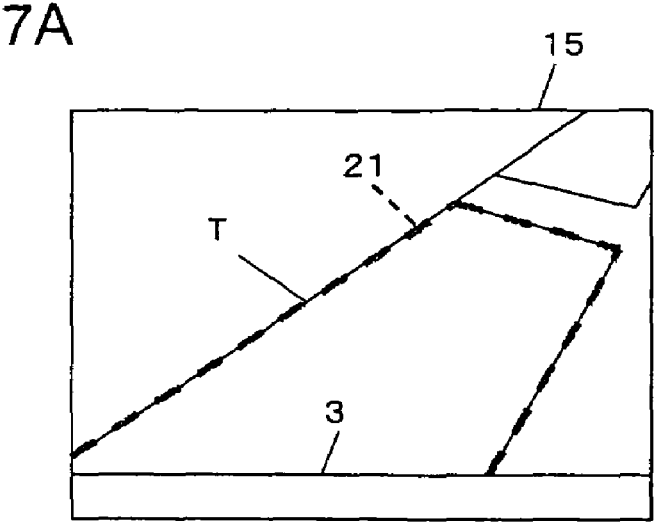
FIGS. 7A to 7C are diagrams showing schematically and stepwise screens of the monitor when performing in-line parking in accordance with Embodiment 1.

The driver stops the vehicle 1 at the vehicle position L1 according to the arrival information. As shown in FIG. 7A, the controller 8 calculates a predicted parking position, where the vehicle is predicted to stop if the driver continues to perform the driving operations in accordance with the guidance information. On the screen 15 of the monitor 4, the controller 8 overlaps a display of a vehicle mark 21 showing an outline image of the vehicle 1 at the predicted parking position. The driver confirms whether or not the vehicle mark 21 showing the predicted parking position is accurately aligned inside the target parking space T on the monitor 4, indicated by the solid lines in FIG. 7A. The vehicle mark 21 may also be displayed immediately before the vehicle 1 stops on the vehicle position L1.

If the vehicle mark 21 is accurately aligned on the target parking space T, the driver can judge that parking is possible if he/she continues to perform the driving operations in accordance with the guidance information. Moreover, the controller 8 calculates the predicted path 14 of the vehicle 1 based on the paths P1 and P2 shown in FIG. 6, and the controller 8 displays the predicted path 14 with lines such as the dotted lines in FIG. 7B so as to overlap with the image behind the vehicle 1 shown on the monitor 4. This predicted path 14 enables the driver to confirm whether or not the vehicle 1 can be parked in the target parking space T with the backward operations being performed, and also to confirm whether or not obstructions are present in the backward path of the vehicle.

Figure 7B:
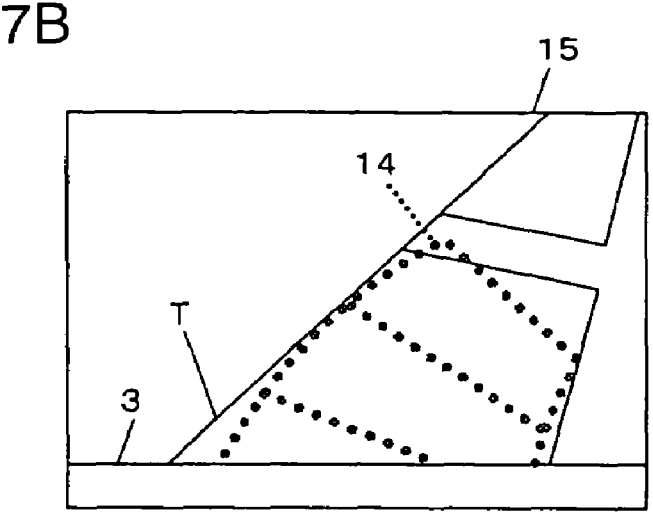
Figure 7C:
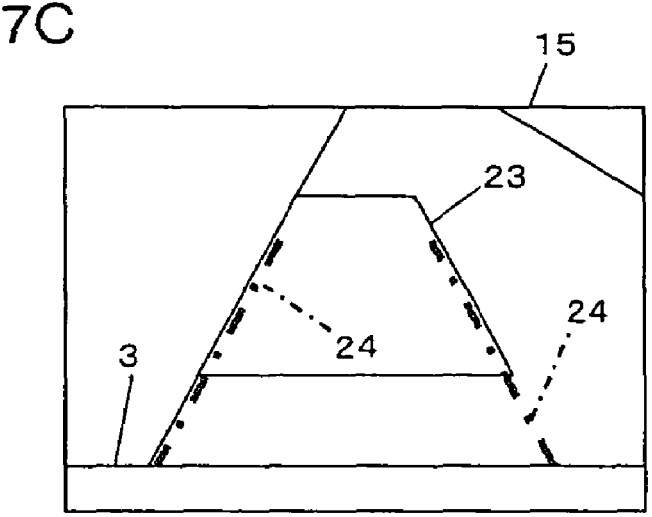

The backward movement of the vehicle 1 is started, and when the yaw angle of the vehicle 1 approaches 0°, the controller 8 provides the approach information to notify that the vehicle 1 approached the vehicle position M1 inside the target parking space T and the arrival information to notify that the vehicle arrived at the vehicle position M1 to the driver via the speaker 13. Further, as shown in FIG. 7C, before the vehicle 1 arrives at the vehicle position M1, the controller 8 displays a pair of left/right guide lines 24, so that the driver can confirm whether or not the vehicle 1 is parked in parallel with respect to a neighboring parking space 23 formed behind the target parking space T, or the shoulder of the road. These guide lines 24 correspond to the pair of sidelines 17a and 17b of the predicted path 14 when moving straight backward, which is shown in FIG. 3A. The driver hears the arrival information from the speaker 13 and sees the guidelines 24 on the monitor 4, whereby the driver can stop the vehicle 1 at the vehicle position M1 to complete the parking.

Note that, at the vehicle position L1, in a case where the vehicle mark 21 is not aligned with the target parking space T, or in a case where an obstruction is present in the backward path predicted by the predicted path 14, the driver can return from the vehicle position L1 to the initial stop position J1, and then perform the parking operations again from a position slightly shifted from the initial stop position J1.

As described above, the driver can confirm the alignment of the predicted path 14, the vehicle mark 21, and the target parking space T which are displayed in an overlapping manner on the monitor 4, to thereby judge in advance whether or not the vehicle 1 can be parked in-line into the target parking space T by continuing to perform the driving operations in accordance with the guidance information from the speaker 13.

Further, based on the predicted path 14, the driver can confirm in advance whether or not obstructions are present in the predicted backward path if the driver continues to perform the driving operations in accordance with the guidance information from the speaker 13.

Further, if the vehicle mark 21 is displayed before the arrival information is emitted, e.g., at approximately the same time as when the approach information is outputted, then the driver can visually confirm whether or not the vehicle 1 has reached the position where the steering wheel 7 should be turned to the opposite direction with reference to the alignment of the vehicle mark 21 and the parking space T in the image.

Figure 8:
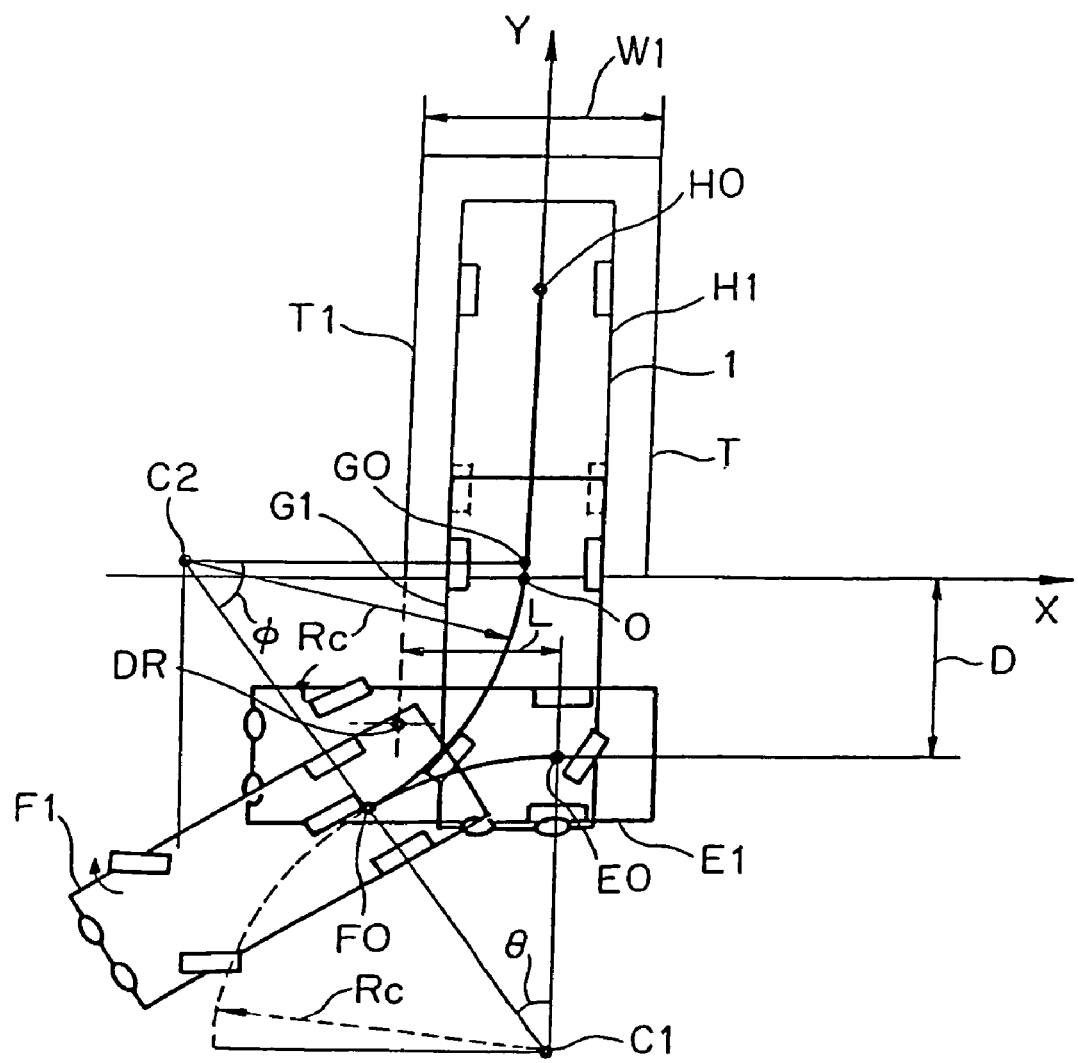
FIG. 8 is a diagram showing schematically and stepwise positions of the vehicle when performing in-parallel parking in accordance with Embodiment 1.

Next, FIG. 8 is used to explain in-parallel parking.

A point of origin 0 is set to the center of the entrance into the parking space T where the vehicle 1 will be parked. A Y-axis is established at a perpendicular angle to the road, extending in the rearward direction from the vehicle 1 in the parking space T. An X-axis is established as extending parallel to the road, i.e., perpendicular to the Y-axis. Further, the width of the parking space T is defined as W1. The parking assisting device assists the driver so that the vehicle 1 is appropriately parked with the rear axle center H0 at the center of the width direction of the parking space T, and the vehicle 1 is in the vehicle position H1 parallel with the length direction of the parking space T.

First, the vehicle 1 is stopped at the initial stop position, which is at a vehicle position E1. The vehicle position E1 is perpendicular to the parking space T, with the rear axle center E0 of the vehicle 1 being at a distance D from the entrance of the parking space T, and the driver's position DR of the vehicle 1 is aligned with a side portion T1 of the parking space T.

Next, the steering wheel 7 is turned to the maximum leftward steering angle and the vehicle 1 which is located at the vehicle position E1 turns on the radius Rc, as it advances to the turn angle θ. When the vehicle 1 arrives at the vehicle position F1, the steering wheel 7 is turned to the maximum rightward steering angle and the vehicle 1 turns on the turning radius Rc, as it retreats by the turning angle φ. When the vehicle 1 reaches the vehicle position G1 parallel to the parking space T, the steering wheel 7 is returned to the straight position, and the vehicle backs up further to park appropriately in the vehicle position H1 inside the parking space T.

Further, at the vehicle positions E1, F1, and G1, the rear axle center is positioned at E0, F0, and G0, respectively.

Here, if L is defined as the distance along the X-axis between the rear axle center E0 and the driver's position DR when the vehicle 1 is located at the vehicle position E1, then the coordinates ($C1x$, $C1y$) of the turning center C1 when turning the vehicle from the vehicle position E1 to the vehicle position F1 are expressed as follows:

$$C1x = L - W1/2$$

$$C1y = -(D + Rc)$$

The coordinates ($C2x$, $C2y$) of the turning center C2 when turning the vehicle from the vehicle position F1 to the vehicle position G1 are expressed as follows:

$$C2x = -(Rc+Rc)\cdot\sin\theta + C1x = -2Rc\cdot\sin\theta + L - W1/2$$

$$C2y = -(Rc+Rc)\cdot\cos\theta + C1y = 2Rc\cdot\cos\theta - (D+Rc)$$

The above-mentioned X coordinate $C2x$ can also be expressed as follows:

$$C2x = -Rc$$

Based on the two relational expressions for the X coordinate $C2x$, $\sin\theta$ is expressed as follows:

$$\sin\theta = (Rc+L-W1/2)/2Rc$$

The value of θ can be calculated using Rc, L, and W1.

Furthermore, the turning φ at which the vehicle 1 turns from the vehicle position F1 to the vehicle position G1 is expressed as follows:

$$\phi = \pi/2 - \theta$$

Figure 9:
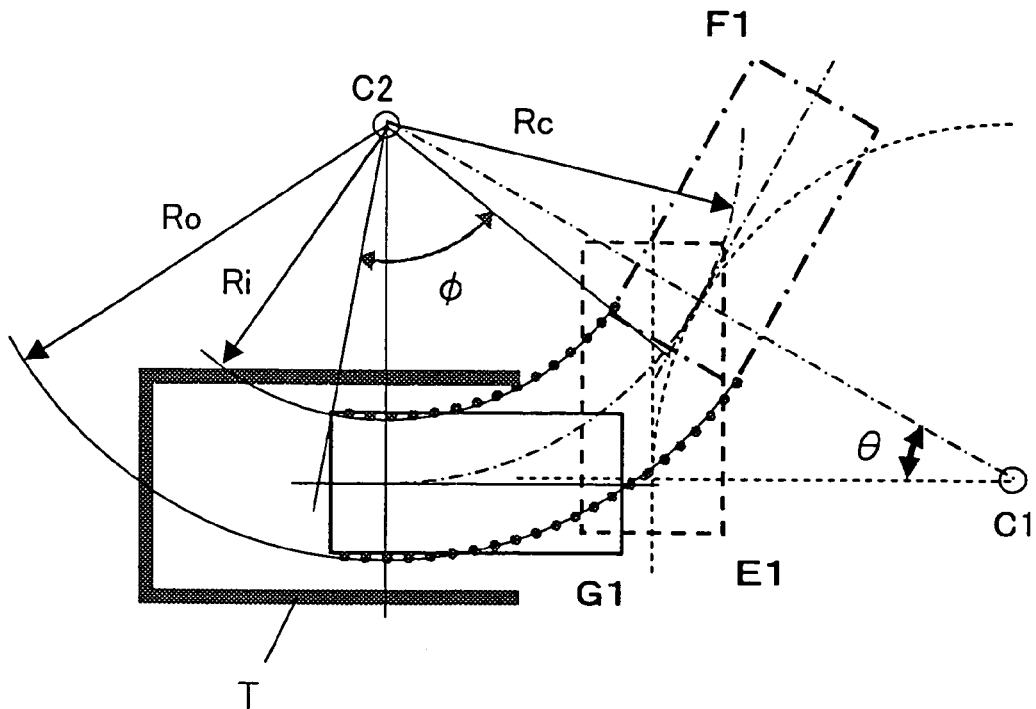
FIG. 9 is a diagram showing schematically and stepwise a path of the vehicle when performing in-parallel parking in accordance with Embodiment 1.

Next, the plotting of the predicted path is explained in a case where, as shown in FIG. 9, when the vehicle 1 is positioned at the vehicle position F1, the steering wheel 7 is turned to the maximum leftward and the vehicle turns and retreats from the vehicle position F1 to reach the vehicle position G1. Here, the vehicle 1 at the vehicle position E1 turns around the turning center C1 on the turning radius Rc at the steering angle of the steering wheel 7 turned to the maximum rightward, as the vehicle 1 advances to the turning angle θ. When the vehicle 1 reaches the vehicle position F1, the vehicle 1 stops and the turning angle of the steering wheel 7 is turned to the maximum leftward, and the vehicle turns around the turning center C2 on the turning radius Rc, as it retreats to the turning angle φ. When the vehicle 1 stops at the vehicle position G1 parallel with the parking space T, the steering wheel 7 is returned to the straight position, and the vehicle backs up further to park appropriately inside the parking space T. Note that, the radii from the turning center C2 to the rear-right end and the rear-left end of the vehicle 1 are Ro and Ri, respectively.

Figure 10:
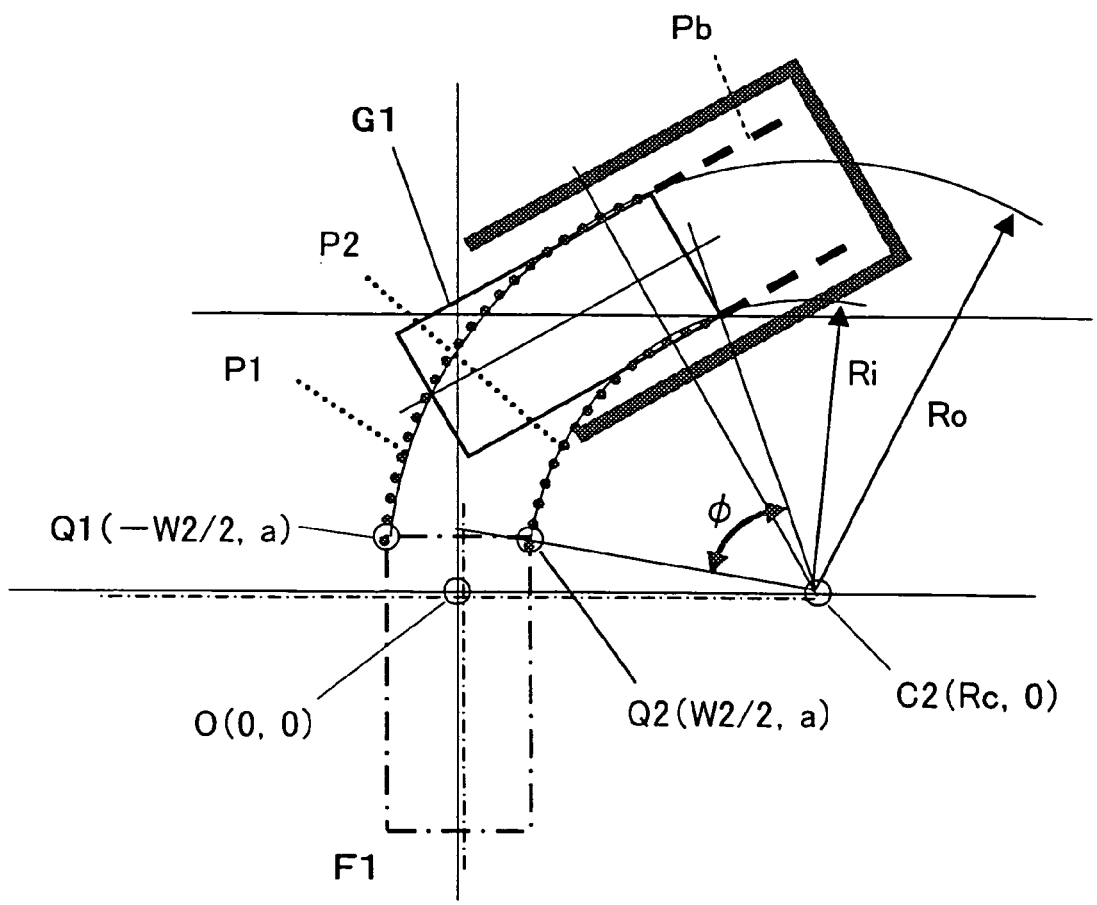
FIG. 10 is a diagram showing how a predicted path of the vehicle is plotted when performing in-parallel parking in accordance with Embodiment 1.

Here, as shown in FIG. 10, with the vehicle 1 at the vehicle position F1, the rear axle center position serves as a point of origin 0, and a Y-axis is taken along the length direction of the vehicle 1 at the vehicle position F1, and an X-axis is taken perpendicular to the Y-axis. With the vehicle 1 located at the vehicle position F1, the coordinates of the rear-right end Q1 are (-W2/2, a), the coordinates of the rear-left end Q2 are (W2/2, a), and the coordinates of the turning center C2 are (Rc, 0). Further, the turning radius Ro of the rear-right end and the turning radius of the rear-left end Ri are expressed as:

$$Ri = \{(Rc-W2/2)^2 + a^2\}^{1/2}$$

$$Ro = \{(Rc+W2/2)^2 + a^2\}^{1/2}$$

Here, the path of the rear-right end Q1 of the vehicle 1 is defined as P1, and the path of the rear-left end Q2 is defined as P2. The path P1 is plotted as an arc having a turning angle φ and a radius of Ro from the point Q1 (-W2/2, a), with the turning center C2 (Rc, 0) as its center. On the other hand, the path P2 is plotted as an arc having a turning angle φ and a radius of Ri from the point Q2 (W2/2, a), with the turning center C2 (Rc, 0) as its center.

When these paths P1 and P2 are actually displayed on the monitor 4 as the paths when the vehicle 1 is located at the vehicle position F1, the path P1 corresponds to the sideline 17b of the predicted path 14 shown in FIG. 3C, and the path P2 corresponds to the sideline 17a.

Note that, the straight path Pb of the vehicle 1 can be plotted by tangent lines extending out from the arcs at the end points of the paths P1 and P2.

Next, explanation is given regarding in-parallel parking operations of the parking assisting device according to Embodiment 1.

First, in FIG. 8, the vehicle 1 is stopped at the vehicle position E1, which is the position where the X coordinate of the driver's position DR is aligned with the side portion T1 of the parking space T, and the vehicle 1 is at a distance of, for example, 50 cm from the entrance to the target parking space T. Here, when the in-parallel mode switch 10 is turned on, this triggers the controller 8 to set the initial stop position to a position where the yaw angle of the vehicle 1 is 0°, and also load the program for in-parallel parking. The driver steers the steering wheel 7 to the maximum leftward, and has the vehicle 1 advance forward in this state.

The controller 8 calculates the yaw angle of the vehicle 1 based on the angular speed of the vehicle 1, which is inputted from the yaw rate sensor 9, and then compares this yaw rate with the turning angle θ, which corresponds to a prescribed yaw rate having been set in advance. Similarly to when performing in-line parking, as the vehicle 1 makes its approach from the vehicle position E1 to the vehicle position F1, the controller 8 provides the approach information to notify that the vehicle 1 approached the vehicle position F1 and the arrival information to notify that the vehicle 1 arrived at the vehicle position F1 to the driver via the speaker 13, based on the difference between the yaw angle and the turning angle θ.

The driver stops the vehicle 1 at the vehicle position F1 as following the arrival information. When the driver puts the shift lever 5 into the reverse position, the screen 15 of the monitor 4 switches to the image behind the vehicle 1 captured by the camera 2. Here, the controller 8 begins the same operations as those when performing in-line parking, shown in FIGS. 7A to 7C. Namely, the controller 8 calculates the predicted parking position where the vehicle 1 to be parked if the driver continues to perform the parking operations in accordance with the guidance information. Then, on the screen of the monitor 4, the controller 8 performs the overlapping display of the vehicle mark showing the outline image of the vehicle 1 in the predicted parking position. The driver confirms whether or not the vehicle mark, which indicates the predicted parking position, is positioned in the center of the width direction of the target parking space T on the monitor 4.

If the vehicle mark is accurately aligned with the center of the target parking space T in the width direction, the driver can judge that parking is possible by continuing to perform the driving operations in accordance with the guidance information. Further, the controller 8 calculates the predicted path of the vehicle 1 based on the above-mentioned paths P1 and P2, and the controller 8 displays the predicted path 14 shown such as the dotted lines in FIG. 3B so as to overlap with the image behind the vehicle 1 shown on the monitor 4. This predicted path 14 enables the driver to confirm whether or not the vehicle 1 can be parked in the target parking space T with the backward operations, and also to confirm whether or not obstructions are present in the backward path of the vehicle.

When the vehicle 1 starts to back up, as the yaw angle of the vehicle 1 approaches 90°, the controller 8 provides the approach information to notify that the vehicle 1 approached the vehicle position G1 inside the target parking space T and the arrival information to notify that the vehicle 1 arrived at the vehicle position G1 to the driver via the speaker 13. Further, immediately before the vehicle 1 arrives at the vehicle position G1, the controller 8 calculates and displays a predicted straight path, based on the above-mentioned path Pb, so that the driver can confirm whether or not the vehicle 1 is parallel to the side portion of the target parking space T. Accordingly, the driver stops the vehicle 1 at the vehicle position G1, and then returns the steering wheel 7 to the straight position and moves the vehicle backwards. When the vehicle 1 enters the target parking space T, parking is complete.

Note that, at the vehicle position F1, if the vehicle mark is not positioned at the center of the width direction of the target parking space T, or if obstructions are present in the backward path predicted as the predicted path 14, the driver can retry the parking operations from a position slightly shifted from the initial stop position E1.

As described above, the driver can confirm the alignment of the predicted path 14, the vehicle mark, and the target parking space T which are displayed in an overlapping manner on the monitor 4, to thereby judge in advance whether or not the vehicle 1 can be parked in parallel into the target parking space by continuing the driving operations in accordance with the guidance information from the speaker 13.

Further, based on the predicted path 14, the driver can confirm in advance whether or not obstructions are present in the predicted backward path if the driver continues to perform the driving operations in accordance with the guidance information from the speaker 13.

Embodiment 2

In Embodiment 1, the predicted path from the vehicle position L1 to the vehicle position M1 was displayed after the vehicle 1 reaches the vehicle position L1 which is the ultimate position where the steering wheel is turned in the opposite direction. However, at the previous vehicle position K1, the ultimate turning path from the vehicle position L1 to the vehicle position M1 can also be displayed as the predicted path. When performing in-line parking, as the vehicle 1 reaches the vehicle position K1, the shift lever 5 is put into the reverse position. When this occurs, the rear view image captured by the camera 2 is displayed on the monitor 4, and the predicted path from the vehicle position L1 to the vehicle position M1 is also displayed on the monitor 4 in an overlapping manner, to facilitate the subsequent operations for backing up the vehicle.

Figure 11:
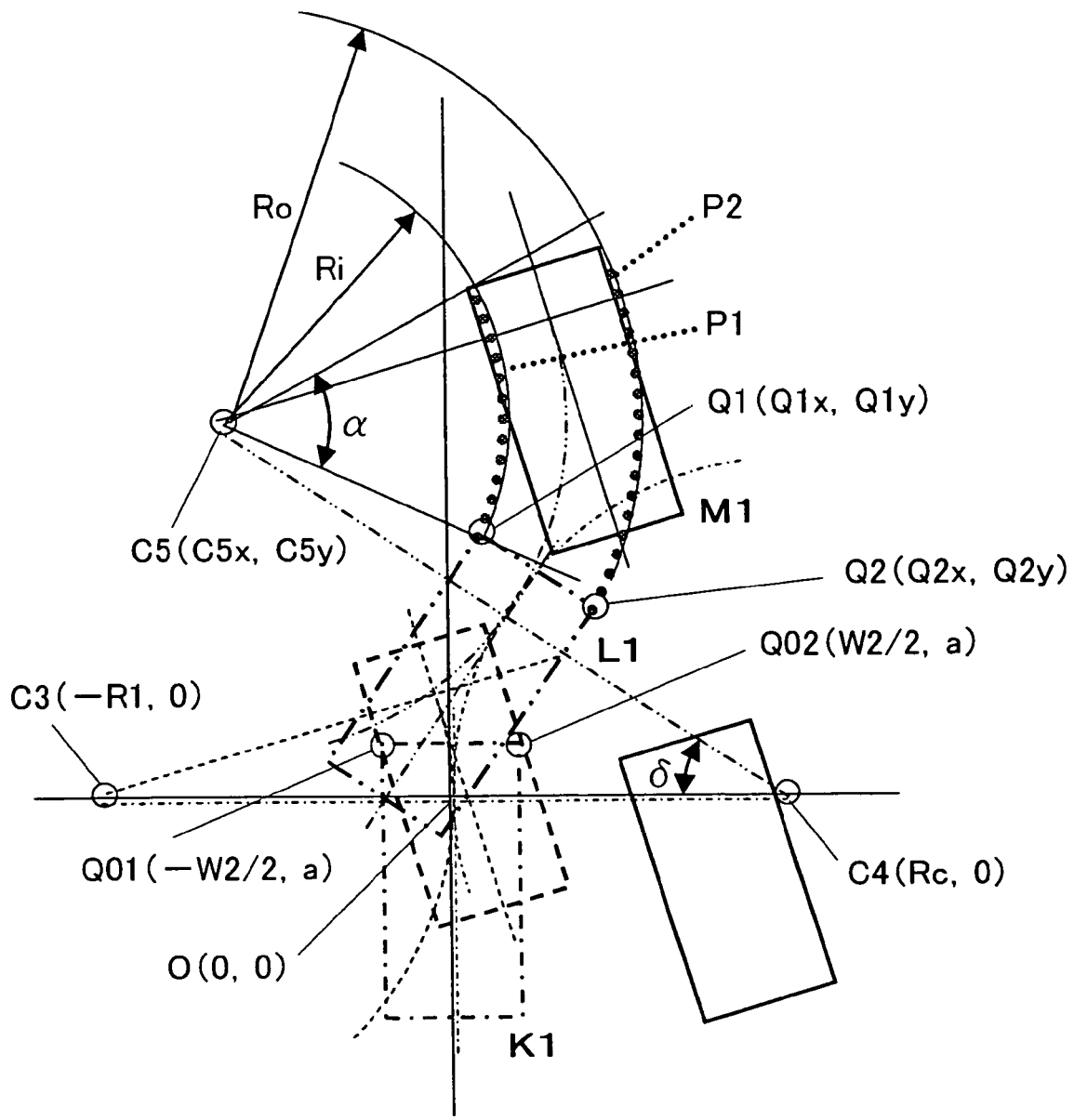
FIG. 11 is a diagram showing how a predicted path of the vehicle is plotted when performing in-line parking in accordance with Embodiment 2.

Explanation is given regarding the way to draw the predicted path with reference to FIG. 11. It is assumed that the radius of the rear-right end and the rear-left end of the vehicle 1 from the turning center are Ri and Ro, respectively. Further, with the vehicle 1 at the vehicle position K1, the rear axle center position serves as a point of origin 0, and a Y-axis is taken along the length direction of the vehicle 1 at the vehicle position K1, and an X-axis is taken perpendicular to the Y-axis. With the vehicle 1 located at the vehicle position K1, the coordinates of the rear-right end Q01 are (−W2/2, a), the coordinates of the rear-left end Q02 are (W2/2, a), and the coordinates of the turning center C4 are (Rc, 0).

Here, the turning center C5 of the ultimate turning paths P1 and P2 from the vehicle position L1 to M1 and the points Q1 and Q2 which are the start points of the paths P1 and P2 are rotated from the turning center C3 and the points Q01 and Q02, respectively, by an angle of −δ around the turning center C4.

Therefore, the coordinates (C5x, C5y) of the turning center C5 are expressed as follows:

$$C5x = (C3x - C4x) \cdot \cos\delta + (C3y - C4y) \cdot \sin\delta + C4x$$
$$= -2Rc \cdot \cos\delta + Rc$$
$$= Rc(1 - 2 \cdot \cos\delta)$$

$$C5y = -(C3x - C4x) \cdot \sin\delta + (C3y - C4y) \cdot \cos\delta + C4y$$
$$= 2Rc \cdot \sin\delta$$

Further, the coordinates (Q1x, Q1y) of the point Q1 are expressed as follows:

$$Q1x = (Q01x - C4x) \cdot \cos\delta + (Q01y - C4y) \cdot \sin\delta + C4x$$
$$= -(W2/2 + Rc) \cdot \cos\delta + a \cdot \sin\delta + Rc$$

$$Q1y = -(Q01x - C4x) \cdot \sin\delta + (Q01y - C4y) \cdot \cos\delta + C4y$$
$$= (W2/2 + Rc) \cdot \sin\delta + a \cdot \cos\delta$$

Further, the coordinates (Q2x, Q2y) of the point Q2 are expressed as follows:

$$Q2x = (Q02x - C4x) \cdot \cos\delta + (Q02y - C4y) \cdot \sin\delta + C4x$$
$$= (W2/2 - Rc) \cdot \cos\delta + a \cdot \sin\delta + Rc$$

$$Q2y = -(Q02x - C4x) \cdot \sin\delta + (Q02y - C4y) \cdot \cos\delta + C4y$$
$$= -(W2/2 - Rc) \cdot \sin\delta + a \cdot \cos\delta$$

From the above calculation, the path of the rear-right end P1 of the vehicle 1 is plotted as an arc having a turning angle α and a radius of Ri from the point Q1 (Q1x, Q1y), with the turning center C5 (C5x, C5y) as its center. On the other hand, the path of the rear-left end P2 is plotted as an arc having a turning angle α and a radius of Ro from the point Q2 (Q2x, Q2y), with the turning center C5 (C5x, C5y) as its center.

When the vehicle 1 arrives at the vehicle position K1 and the driver puts the shift lever 5 into the reverse position, the controller 8 calculates the predicted path from the vehicle position L1 to M1 based on the paths P1 and P2, and displays the predicted path in the monitor 4 so as to overlap the image behind the vehicle 1 captured by the camera 2. Similarly to Embodiment 1, the predicted path enables the driver to confirm in advance whether or not the vehicle 1 can be parked into the target parking space T by continuing the operation of backing up, and to confirm whether or not obstructions are present in the backward path.

Similarly, it is also possible to calculate the predicted parking position when the vehicle 1 reaches the vehicle position K1, and can perform the overlapped display of the vehicle mark at the predicted parking position on the screen of the monitor 4.

Further, it is also possible to display the predicted path from K1 to L1 when the vehicle 1 arrives at the vehicle position K1.

In accordance with Embodiment 2, at the vehicle position K1 the driver can confirm the possibility of parking in the target parking space T and the presence/absence of obstructions. Therefore, he/she can make a quicker judgment regarding returning and trying again from the initial stop position J1, etc.

Embodiment 3

Figure 12A:
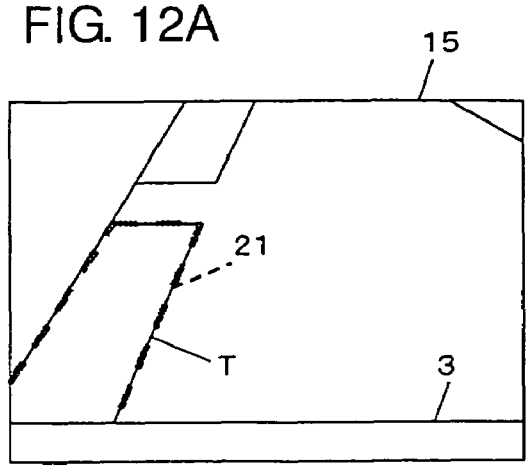
FIGS. 12A to 12F are diagrams showing schematically and stepwise screens of the monitor when performing in-line parking in accordance with Embodiment 3.
Figure 12D:
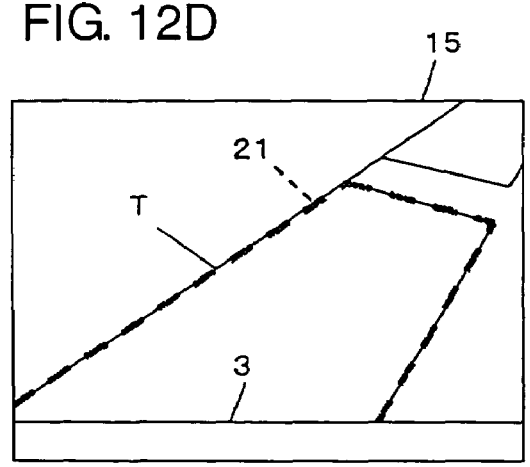
Figure 12B:
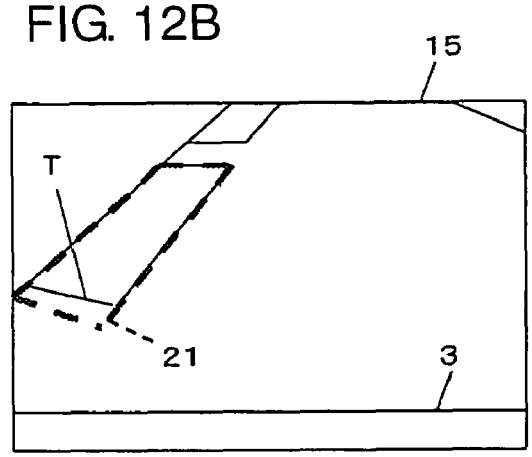
Figure 12E:
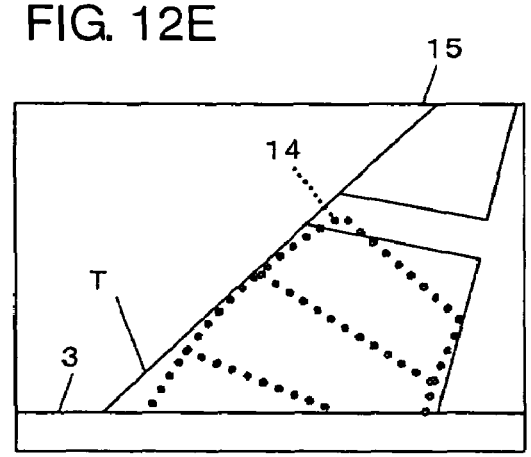
Figure 12C:
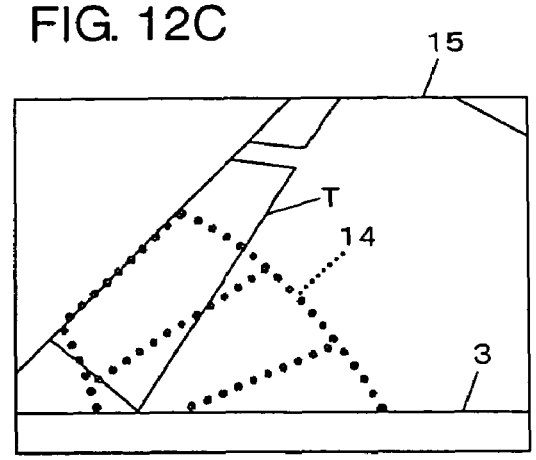
Figure 12F:
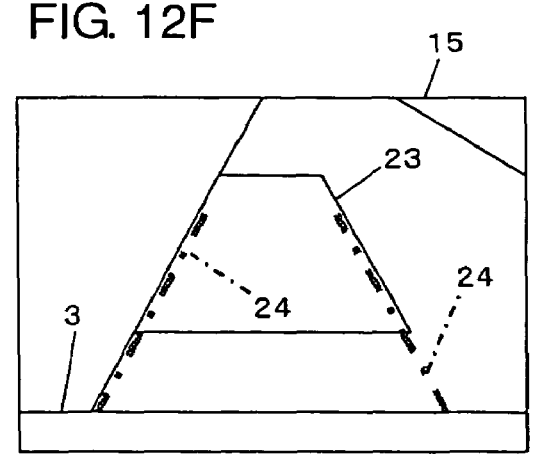

In a parking assisting device according to Embodiment 3, when performing in-line parking in Embodiment 1, the predicted path or the vehicle mark can be displayed once the vehicle 1 reaches the vehicle position J1, which is the initial stop position. In other words, as shown in FIG. 12A, when the driver stops the vehicle 1 at the vehicle position J1 and inputs his/her intention to park, e.g., by operating the in-line mode switch, the controller 8 calculates the predicted parking position that is predicted at this position J1, and displays the vehicle mark 21 at the predicted parking position on the screen 15 of the monitor 4. Next, in FIG. 12B, the vehicle 1 moves forward, and immediately before the vehicle 1 arrives at the vehicle position K1, the vehicle mark 21 is displayed at the predicted parking position that is predicted at this position K1. Then, as shown in FIG. 12C, when the vehicle 1 starts to turn backwards from the vehicle position K1 to the vehicle position L1, the predicted path 14 from the vehicle position K1 to the vehicle position L1 is displayed. Further, as shown in FIGS. 12D to 12F, immediately before the vehicle 1 reaches the vehicle position L1, operations similar to those of Embodiment 1 shown in FIGS. 7A to 7C are performed.

Note that, at the vehicle positions K1 and L1, when the vehicle mark 21 is not aligned with the target parking space T, or when obstructions are present in the backward path predicted in the predicted path 14, the driver may return from the vehicle position K1 or L1 to the initial stop position at vehicle position J1, and may retry the driving operations to park the vehicle from a position slightly shifted from the initial stop position J1. Further, in a case where the vehicle mark 21 displayed at the vehicle position J1 is not aligned with the target parking space T, the driver can move the vehicle 1 slightly before starting the parking operations again.

Similarly to Embodiment 1, the predicted path and the predicted parking position described above enable the driver to confirm in advance whether or not the vehicle 1 can be parked into the target parking space T by continuing to move the vehicle 1 backward, and can confirm whether or not obstructions are present in the backward path.

Further, in Embodiment 3, at the initial stop position at vehicle position J1, the driver can confirm the possibility of parking in the target parking space T and the presence/absence of obstructions. Therefore, he/she can make an even quicker judgment regarding whether to return to the initial stop position and retry the operations, etc.

Figure 13:
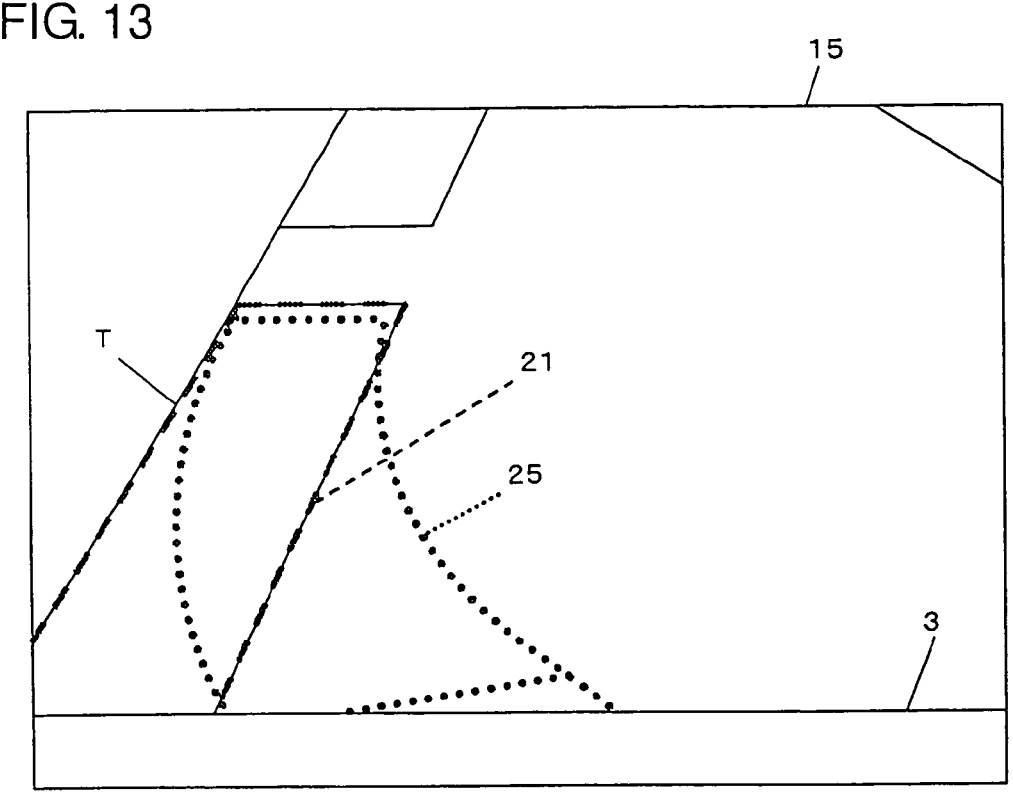
FIG. 13 is a diagram schematically showing screens of the monitor when the vehicle is at an initial stop position, when performing in-line parking in accordance with a modification of Embodiment 3.

Note that, instead of displaying the predicted paths 14 from the respective vehicle positions K1 and L1 to the subsequent respective vehicle positions L1 and M1 as described above, as shown in FIG. 13, it is also possible to display a predicted path 25 which incorporates all the predicted paths from each of the vehicle positions J1, K1, and L1 along with the vehicle mark 21 displayed at the position J1. At this time, instead of simultaneously displaying the vehicle mark 21 and the predicted path 25, the display may alternate between the vehicle mark 21 and the predicted path 25, displaying each for given durations of time.

Further, in addition to the rear view camera 2 in Embodiment 1, if the vehicle 1 is also provided with a side monitoring camera on a lateral side of the vehicle 1 to serve as side monitoring means, then, when performing in-parallel parking, the predicted path and the vehicle mark can be displayed from the initial stop position at the vehicle position E1, similarly to the case of performing in-line parking as described above.

Embodiment 4

Figure 14:
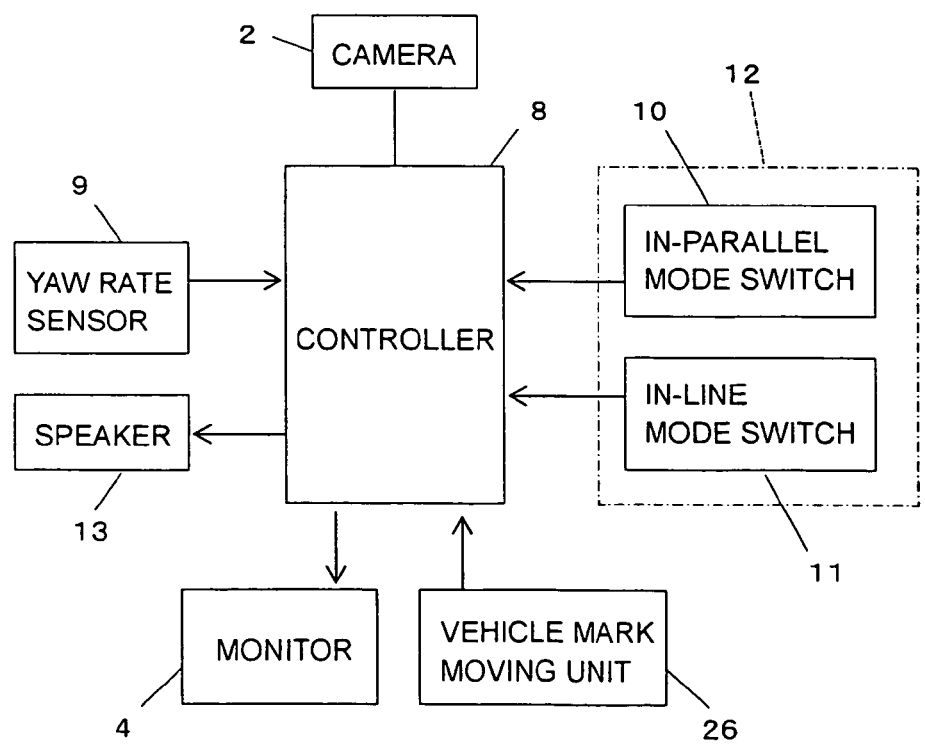
FIG. 14 is a block diagram showing a construction of a parking assisting device according to Embodiment 4.

FIG. 14 shows a configuration of a parking assisting device according to Embodiment 4. This parking assisting device includes the device of Embodiment 1 shown in FIG. 2, and at the driver seat of the vehicle 1, there is arranged a vehicle mark moving unit 26 for moving the vehicle mark 21 on the screen of the monitor 4. Then, the vehicle mark moving unit 26 is connected to the controller 8. Note that the vehicle mark moving unit 26 constitutes predicted parking position display moving means of the present invention.

For example, when the vehicle 1 is stopped at the initial stop position at the vehicle position J1 and the in-line mode switch 11 is turned on, in the case of in-line parking, the controller 8 calculates the predicted parking position, and as shown in FIG. 12A, performs the overlapped display of the vehicle mark 21 at the predicted parking position on the screen 15 of the monitor 4. At this time, if there is any misalignment between the initial stop position where the vehicle 1 actually stopped and the vehicle position J1, the vehicle mark 21 does not align with the target parking space T on the monitor 4 and is deviated from the parking space T.

Therefore, Embodiment 4 is configured such that the vehicle mark 21 on the monitor 4 can be moved by the vehicle mark moving unit 26 arranged on the driver seat, and when the vehicle mark 21 displayed at the initial stop position is deviated from the parking space T, the driver uses the vehicle mark moving unit 26 to move the vehicle mark 21 to align it with the parking space T. Note that the movement by the vehicle mark moving unit 26 includes vertical movement, horizontal movement, and rotation on the monitor 4. Based on the amount of movement by the vehicle mark 21, the controller 8 calculates a gap between the initial stop position where the vehicle actually stopped and the vehicle position J1. Based on the calculated gap and the standard coordinates $J0x$, $J0y$ of the rear axle center J0, the controller 8 obtains the coordinates $(J0x+dx, J0y+dy)$ of the rear axle center J0' at the actual initial stop position, and adjusts the above-mentioned turning angles $\alpha$, $\beta$ and $\delta$ so that the vehicle 1 can be appropriately parked in-line into the parking space T.

Then, the adjusted turning angles $\alpha$, $\beta$ and $\delta$ are used as prescribed yaw angles to create the guidance information, which is sent to the driver. Accordingly, the vehicle 1 can be appropriately parked into the parking space T.

Further, in the case where the vehicle mark moving unit 26 also has the function to rotate the displayed vehicle mark and obtain the angle $\epsilon$ formed by the actual initial stop position and the vehicle position J1, the controller can be given a function to generate the guidance information based on the angle $\epsilon$. Thus the vehicle 1 can be appropriately parked into the parking space T even in a case where the initial stop position is slanted with respect to the target parking space.

Further, it is also possible to provide a movement amount storing unit for storing the movement amount of the vehicle mark 21 moved by the vehicle mark moving unit 26. Next time parking assistance is performed, the predicted path 14 and the vehicle mark 21 may be displayed and the guidance information may be generated based on the stored movement amount. In this case, it becomes possible to accommodate to the driver's habits through guidance. For example, when performing in-line parking, if the driver has a habit of stopping the vehicle at the initial position in a condition that the vehicle is slanted in a predetermined direction with respect to the target parking space, then it will be necessary to significantly move the vehicle mark 21 for the first time. However, from the next time, the parking guidance can begin with fewer operations or no operations. The movement amount storing unit can be formed by the controller 8.

Note that if the side monitoring camera is provided, by using the vehicle mark moving unit 26 to move the vehicle mark 21 on the monitor 4 even in in-parallel parking, the vehicle 1 can be appropriately parked into the parking space T without moving the vehicle 1 to the initial stop position again even if the initial stop position where the vehicle 1 actually stopped is slightly deviated.

Embodiment 5

In a parking assisting device according to Embodiment 5, the predicted paths 14 and 25 and the predicted parking position vehicle mark 21 which are displayed on the monitor 4 when performing the parking assistance of Embodiments 1 to 4 move together with the image from the camera 2, as the vehicle 1 moves. In in-line parking and in-parallel parking, the relative position of the vehicle 1 to the predicted path and predicted parking position, which are calculated for each vehicle position, change as the vehicle 1 moves. In the present invention, the parking assistance is performed on the assumption that a turning radius is the minimum turning radius to be Rc, which is achieved by turning the steering wheel 7 to the maximum left or right. Therefore, the amount of change in the relative position of the predicted path and the predicted parking position to the vehicle 1 can be calculated by using the yaw rate sensor 9, etc. and detecting the turning angle of the vehicle 1. Therefore, when performing the parking assistance, the change amount is taken into consideration to update the predicted path and the predicted parking position continuously. Accordingly, the predicted path and the vehicle mark which are displayed in an overlapping manner on the monitor 4 can be gradually moved on the monitor 4 as the vehicle 1 moves, so as to always display the same position relative to the image such as road surface captured by the camera 2.

As a result, even while the vehicle 1 is moving from each vehicle position to the next vehicle position, the driver can confirm at any time whether or not the vehicle 1 can be parked into the parking space T by continuing the driving operations just like that in accordance with the guidance information.

Embodiment 6

In a parking assisting device according to Embodiment 6, for example, when performing in-line parking, before arriving at the initial stop position at the vehicle position J1, the in-line mode switch 11 is turned on and the vehicle mark 21 displaying the predicted parking position is displayed as the vehicle 1 moves forward, and vehicle 1 stops when the vehicle mark 21 approaches most the parking space T in the image. Here, the in-line mode switch 11 is turned on once again to thereby output guidance information such as shown in Embodiments 1 to 5 so as to guide the driver through the subsequent driving operations. Those operations enable the vehicle 1 to accurately stop at the initial stop position at the vehicle position J1, thus enabling more precise parking assistance. Note that when performing in-parallel parking, in the case where the side monitoring camera is provided, if the driver performs the same operations as in the case of performing in-line parking described above, the driver can confirm the vehicle mark 21 and the parking space T on the monitor 4 as he/she stops the vehicle 1 at the vehicle position E1 that is the initial stop position, thus obtaining the same effect.

Embodiment 7

Figure 15A:
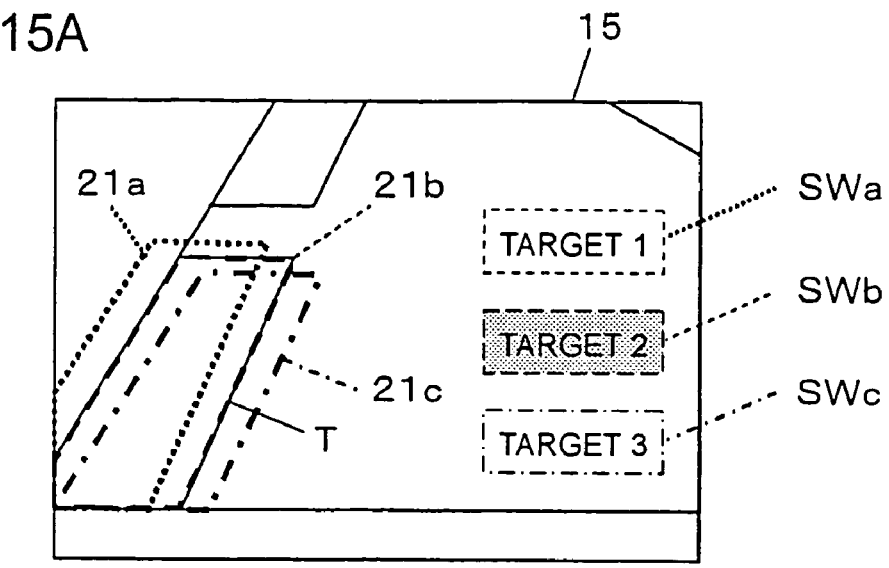
FIGS. 15A to 15C are diagrams showing screens of the monitor when performing in-line parking in accordance with Embodiment 7.

In the case of performing in-line parking, when at the initial stop position, if the driver operates, for example, the in-line mode switch 11 to input the intention to park, then a plurality of predicted parking position are displayed on the screen 15 of the monitor 4, and the driver can select one from those, whereby the subsequent parking guidance can be performed. For example, as shown in FIG. 15A, if the driver stops the vehicle 1 at the initial stop position and operates the in-line mode switch 11, then the three vehicle marks 21a to 21c are displayed in an overlapping manner on the screen 15 of the monitor 4, each at slightly deviated sideways positions. Those vehicle marks 21a to 21c are displayed at predicted parking positions set in advance in the controller 8. Further, as predicted parking position selection means, touch switches SWa to SWc marked as "Target 1" to "Target 3" corresponding to the vehicle marks 21a to 21c, respectively, are displayed on the screen 15.

The driver selects the vehicle mark closest to the target parking space T from the vehicle marks 21a to 21c on the screen 15, and operates the touch switch corresponding to that vehicle mark. For example, in FIG. 15A, the touch switch SWb ("Target 2") is operated to select the vehicle mark 21b. Similarly, in the situations shown in FIGS. 15B and 15C, the vehicle mark 21a is selected by operating the touch switch SWa ("Target 1"), and the vehicle mark 21c is selected by operating the touch switch SWc ("Target 3"), respectively.

Figure 16:
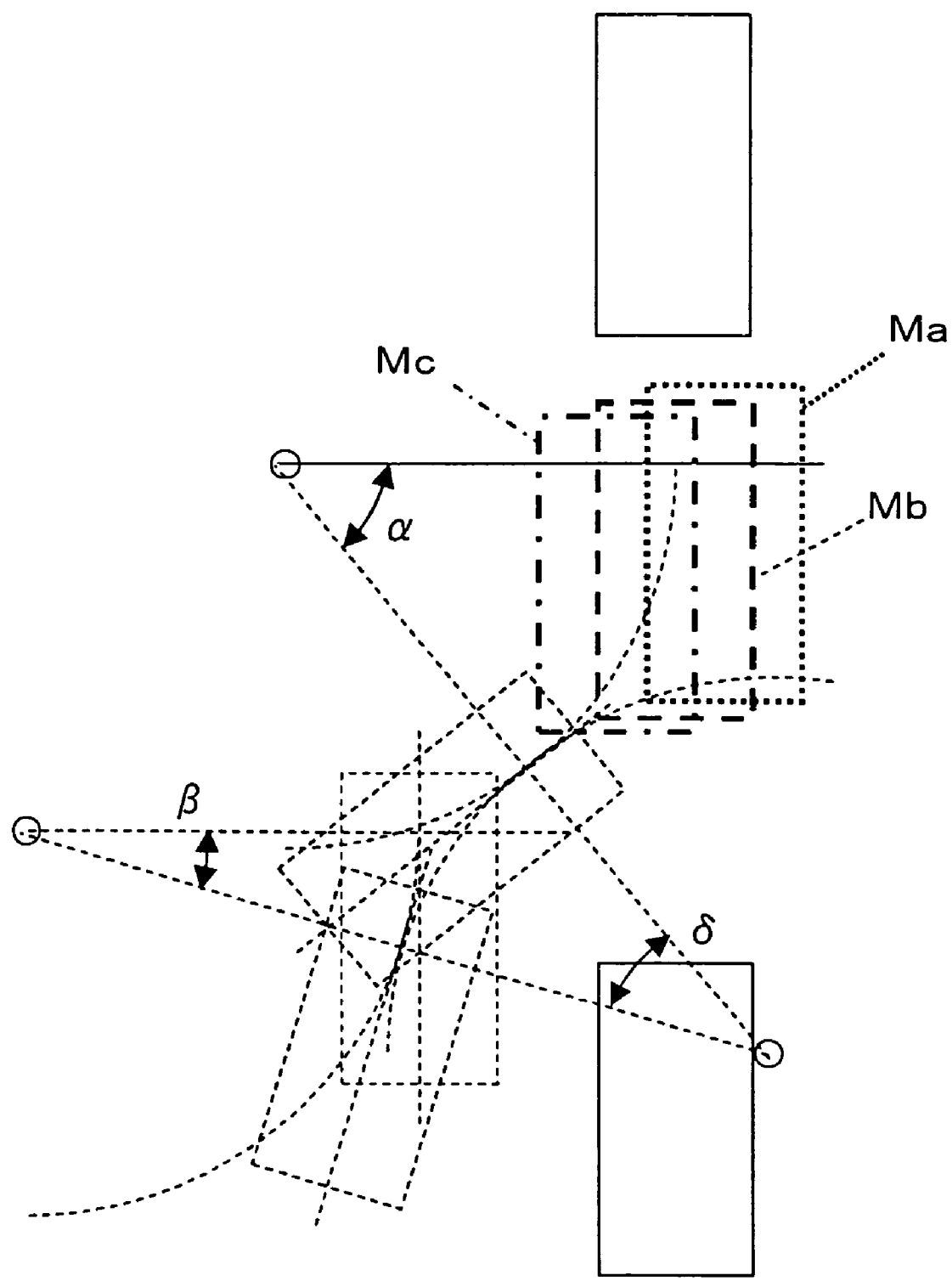
FIG. 16 is a diagram showing in summary a method of calculating predicted parking positions in accordance with Embodiment 7.

By performing the above-mentioned operations, a corresponding horizontal movement distance DX and vertical movement distance DY are determined. Therefore, as shown in FIG. 16, the target turning angles $\alpha$, $\beta$, and $\delta$, which correspond to the predicted parking positions Ma, Mb, and Mc displayed at the vehicle marks 21a, 21b, and 21c, respectively can be calculated.

In this case, the driver can perform forward/backward adjustment of the initial stop position by looking at the alignment of the vehicle marks 21a to 21c with the target parking space T on the screen 15, as the driver moves the vehicle 1 forward or backward.

Figure 15B:
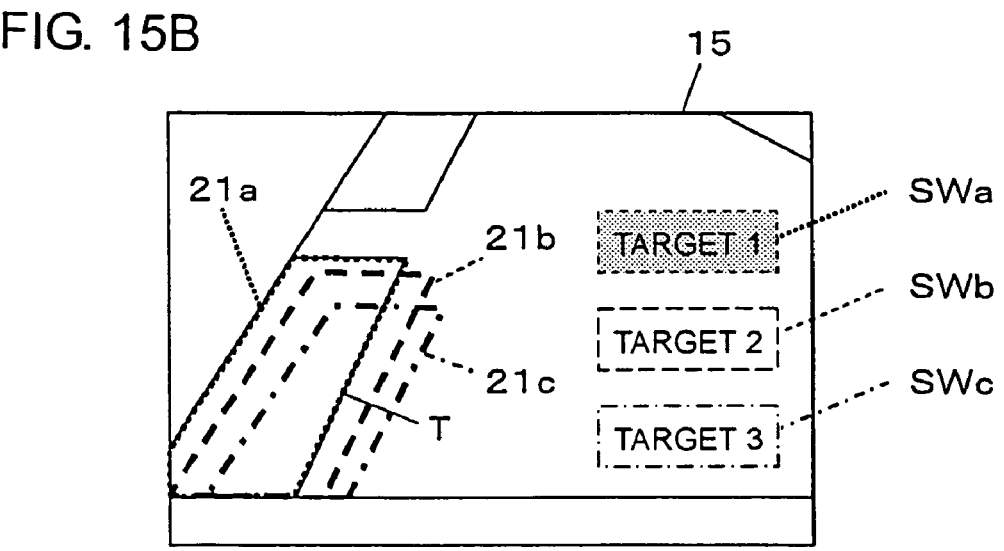
Figure 15C:
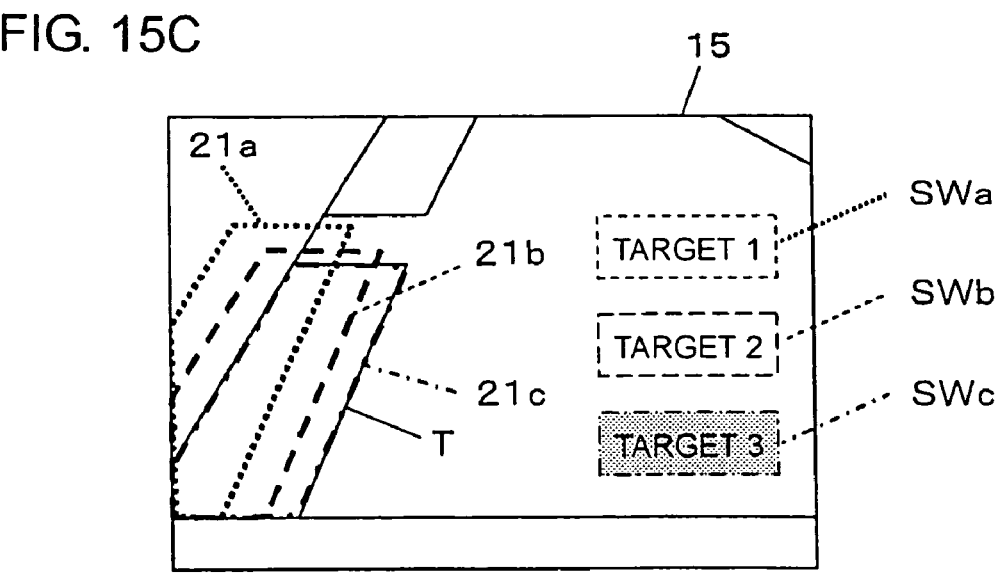

Note that, in FIGS. 15A to 15C, the vehicle marks 21a to 21c are displayed at positions that are slightly shifted from each other in the forward/backward direction. However, restriction is not made to this configuration. The vehicle marks 21a to 21c can be displayed all at the same position with respect to the forward/backward direction, while being shifted in the sideways direction only. However, it is easier for the driver to view and select the vehicle marks 21a to 21c if the marks are displayed at positions shifted in the forward/backward direction.

Further, in the case where the vehicle marks 21a to 21c are shifted in the sideways direction, it is desirable that the marks are shifted by, for example about 20 cm from each other on the actual road surface.

Instead of the touch switches SWa to SWc formed on the screen 15, a dedicated selection switch serving as the predicted parking position selection means can be placed around the edge of the monitor 4 or the like. This selection switch can be used to select the vehicle marks 21a to 21c.

Further, the number of vehicle marks is not restricted to three. For example, two, four, or more vehicle marks can be displayed in an overlapping manner at different positions on the screen 15. In any case, it is essential that the switches enable selection of the individual marks.

Note that, in Embodiment 7, the plurality of vehicle marks, which were slightly shifted from each other in the sideways direction, were used to make adjustments in the sideways direction at the initial stop position. However, similarly, a plurality of vehicle marks slightly shifted from each other in the forward/backward direction can be displayed in an overlapping manner on the screen 15 of the monitor 4 so that the driver can use the touch switch or the like corresponding to those vehicle marks to select one of those vehicle marks to make adjustments in the forward/backward direction at the initial stop position. Furthermore, it is also possible to use plural vehicle marks shifted from each other in the sideways direction or in the forward/backward direction to make adjustments in the sideways direction and adjustments in the forward/backward direction at the initial stop position.

Embodiment 8

In the above-mentioned Embodiment 6, before arriving at the initial stop position, the vehicle mark was displayed on the image shown on the screen 15, and the vehicle 1 was stopped according to the alignment of the vehicle mark and the target parking space T, whereby the appropriate initial stop position is achieved. However, in Embodiment 8, after stopping at the initial stop position as shown in Embodiment 1, the vehicle mark is displayed in an overlapping manner in the image on the screen 15, at a position near the reverse movement start position such as the vehicle position K1 in the case of in-line parking as shown in FIG. 4, or the vehicle position F1 in the case of in-parallel parking as shown in FIG. 8, and the vehicle 1 is stopped in accordance with the alignment of the vehicle mark and the target parking space T. Consequently, the appropriate reverse movement start position can be obtained, whereby the vehicle 1 can be led into the target parking space T by performing the subsequent operations as instructed by the guidance information, even in the case where the initial stop position is slightly misaligned.

Figure 17:
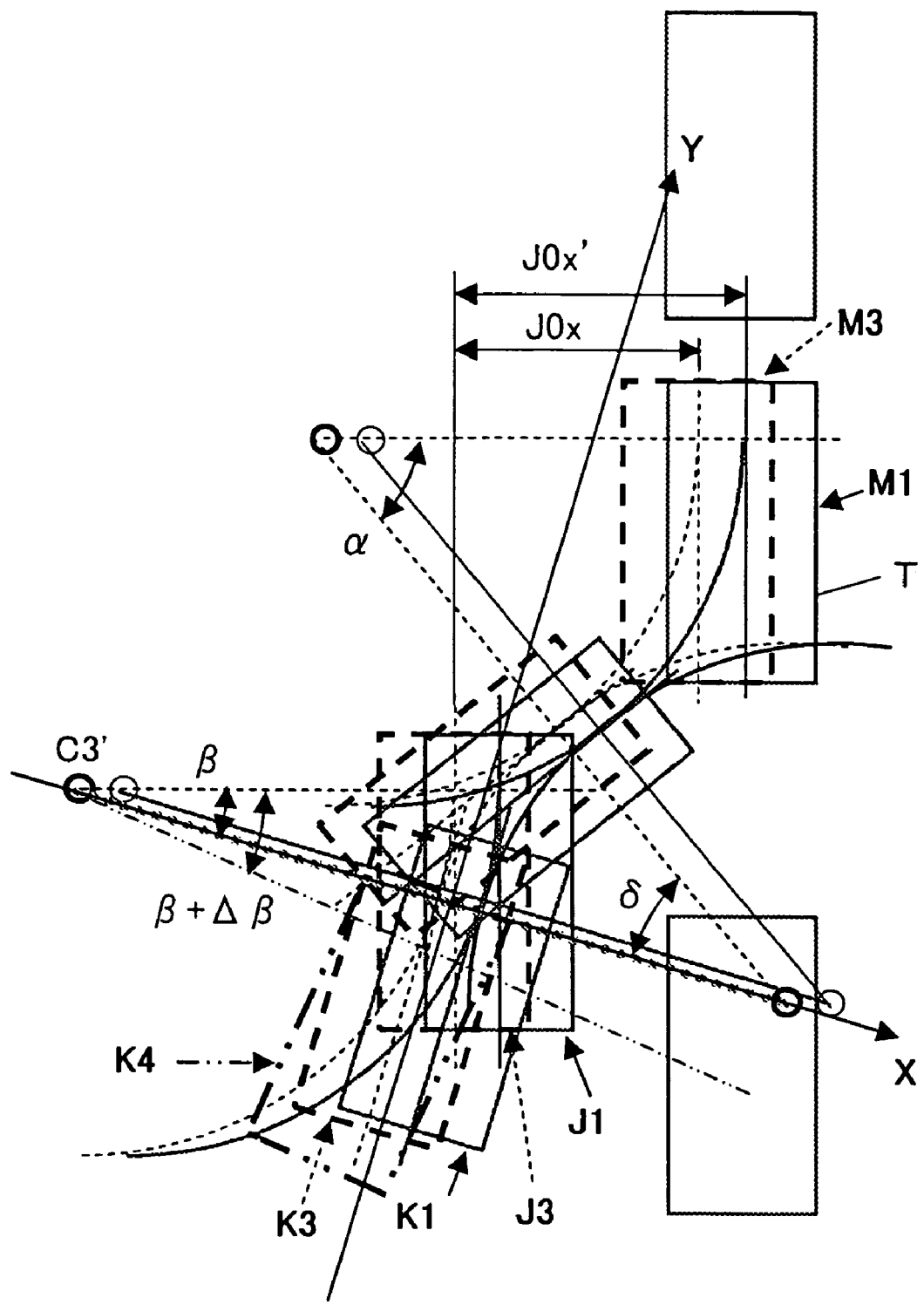
FIG. 17 is a diagram schematically showing positions of the vehicle when performing in-line parking in accordance with Embodiment 8.

For example, when the vehicle 1 reaches the vehicle position K1 which is the reverse movement start position when performing in-line parking, the predicted path and the predicted parking position are calculated and displayed as described in Embodiment 2. However, as shown in FIG. 17, if the vehicle starts moving from the position J3 which is shifted by one vehicle width from the calculatory normal initial stop position J1, then, when the driver follows the guidance information and turns the vehicle 1 at an angle β while moving the vehicle forward to reach at the vehicle position K3, the vehicle mark indicating the predicted parking position will be displayed at the vehicle position M3 which is not aligned with the target parking space T shown in the background. However, this misalignment only occurs in the width direction of the vehicle 1. It is assumed that the parallel relationship with respect to the road, and the setting in the forward/backward direction, are accurate.

Here, the driver turns on a correction switch (not shown in the figure), making the controller 8 to a correction mode. When the steering angle of the steering wheel 7 is made the maximum rightward and the vehicle 1 is moved forward in this state, the vehicle 1 turns and reaches the vehicle position K4. At this time, the turning angle from the vehicle position J3 is β+Δβ.

The following formulae are for calculating the turning angles α and β.

$$JOx = 2Rc \cdot (\cos \alpha - \cos \beta) \quad (1)$$

$$JOy = 2Rc \cdot (\sin \beta - \sin \alpha) \quad (2)$$

Based on the formulae, the coordinates (J0$x'$, J0$y'$) of the rear axle center J0 of the vehicle 1 at the vehicle position J3 become as follows, where α' represents the ultimate turning angle corresponding to the turning angle β+Δβ.

$$JOx' = 2Rc \cdot \{\cos \alpha' - \cos(\beta + \Delta\beta)\}$$

$$JOy' = 2Rc \cdot \{\sin(\beta + \Delta\beta) - \sin \alpha'\}$$

Note that, as described above, it is assumed that there is no misalignment in the forward/backward direction at the vehicle position J3. Therefore, the Y coordinate J0$y'$ remains as J0$y$ without any changes. By executing the above-mentioned formulae, the X coordinate J0$x'$ and the ultimate turning angle α' are obtained.

The predicted parking position M3 displayed at the vehicle position K3 is equivalent to the predicted parking position M1 seen from the vehicle position K1, and corresponds to a position obtained by rotating the position M1 seen from the vehicle position J1, i.e. rotating the vehicle position achieved when the rear axle center coordinates are (−J0$x$, −J0$y$) and parallel to the vehicle 1 from the position J3 by an amount equivalent to the angle β, around the turning center (−Rc, 0) when moving to the position K1. Therefore, a point of origin is established at the rear axle center when the vehicle 1 is at the vehicle position K3, and a y-axis is taken in the direction rearward therefrom, and an x-axis is taken in a direction perpendicular toward the left. Using this coordinate system, the coordinates (M3$x$, M3$y$) of the rear axle center at the predicted parking position M3 are expressed as follows:

$$M3x\ (K3) = (-JOx + Rc) \cdot \cos \beta + JOy \cdot \sin \beta - Rc$$

$$M3y\ (K3) = (-JOx + Rc) \cdot \sin \beta - JOy \cdot \cos \beta$$

Note that, the values of J0$x$ and J0$y$ are negative values at this time.

When calculated in a similar manner, if the vehicle position K4 is taken as the point of origin, the following equations express the coordinates (M3$x$, M3$y$) of the rear axle center by use of the above-mentioned J0$x'$ and α' when the vehicle 1 is at the predicted parking position M3.

$$M3x\ (K4) = (-JOx' + Rc) \cdot \cos(\beta + \Delta\beta) + JOy \cdot \sin(\beta + \Delta\beta) - Rc$$

$$M3y\ (K4) = (-JOx' + Rc) \cdot \sin(\beta + \Delta\beta) - JOy \cdot \cos(\beta + \Delta\beta)$$

When the vehicle 1 reaches the position K4, this position is set as the rear axle center, and the vehicle mark is displayed on the screen 15 in the monitor 4 at the predicted parking position in such a way that the angle made with the vehicle 1 is β+Δβ. This position appears at a position closer to the side of the road than the M3 position plotted when the vehicle 1 was at the vehicle position K3. If the vehicle 1 continues to move forward, the position approaches the side of the road as the vehicle 1 advances. Finally, the vehicle mark is displayed beyond the side of the road.

The driver makes the vehicle 1 advance or retreat such that the vehicle mark aligns with the target parking space T. In other words, the driver stops the vehicle 1 when appropriately when matching the Δβ. The controller 8 calculates the ultimate turning angle α' corresponding to the angle β+Δβ.

At the vehicle position K4, the driver turns the steering angle of the steering wheel 7 in the opposite direction to the maximum leftward and moves the vehicle backward, and then stops the vehicle 1 at a position where the yaw angle of the vehicle 1 becomes α', in accordance with the guidance information from the controller 8. Then, the driver turns the steering angle of the steering wheel 7 in the opposite direction toward the maximum rightward. When the driver stops the vehicle 1 at the position where the yaw angle of the vehicle 1 is 0°, the parking is complete.

Note that, it is also possible to display the vehicle mark 21 showing the predicted parking position at an appropriate time after the vehicle 1 starts to advance from the vehicle position J1, e.g., when the actual turning angle of the vehicle 1 exceeds a predetermined value. In such a case, it is not necessary to operate the correction switch (not shown in the diagram).

Similarly, when performing in-parallel parking, the vehicle mark may be displayed in an overlapping manner in the image on the screen 15 near the vehicle position F1 which is the position where the vehicle 1 starts moving in reverse, and the driver can stop the vehicle 1 according to the alignment of the vehicle mark and the target parking space T. As a result, even in the case where the initial stop position is slightly misaligned, it is still possible to obtain the reverse start position that is appropriate for guiding the vehicle 1 into the target parking space by continuing to perform the operations thereafter as instructed by the guidance information.

Figure 18:
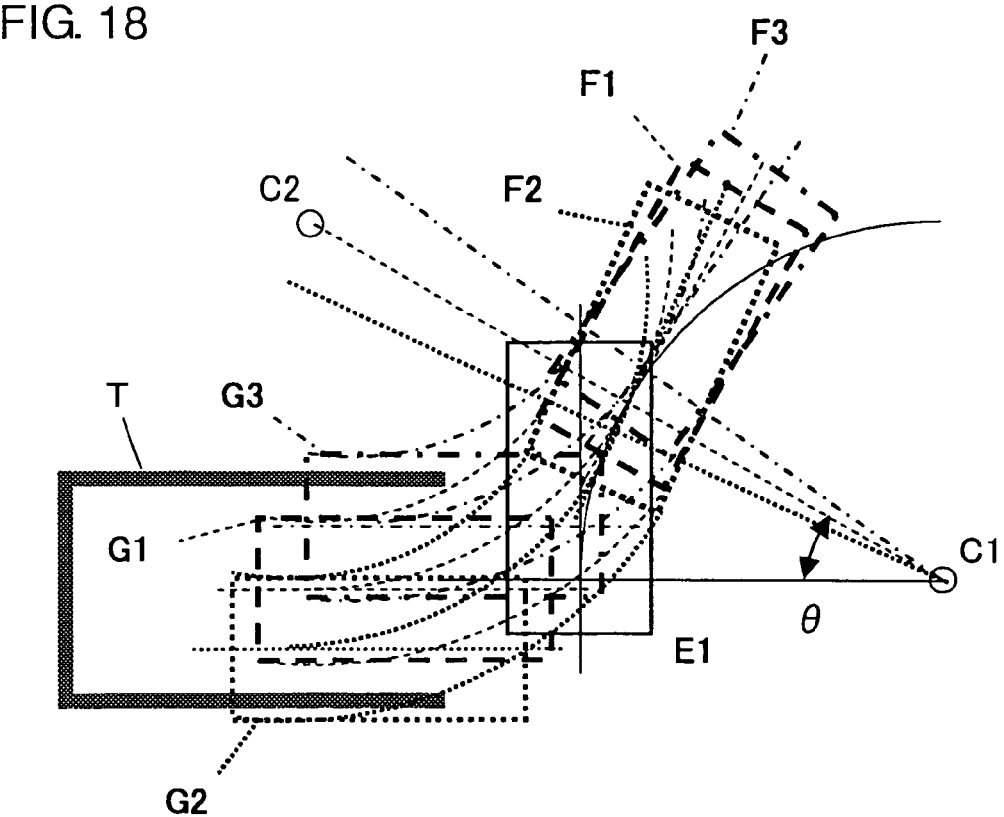
FIG. 18 is a diagram schematically showing positions of the vehicle when performing in-parallel parking in accordance with Embodiment 8.

In FIG. 18, the vehicle 1 is stopped at the vehicle position E1 which is the initial stop position, and the in-parallel mode switch 10 is turned on to load the parking assistance system. When the steering angle of the steering wheel 7 is turned to the maximum turn angle and the vehicle moves forward in this state to reach the vehicle position F1 which is the reverse start position, if the vehicle 1 is stopped at the position F2 that is located in front of the normal calculated stop position F1 and starts to move backward, the vehicle will end up at the vehicle position G2. Conversely, if the vehicle 1 goes too far past the normal calculated stop position F1 and stops at the position F3 and starts to move backward, then the vehicle 1 will end up at the vehicle position G3. However, this is based on the assumption that the vehicle 1 is accurately set in a perpendicular relationship to the target parking space T.

In other words, by selecting the turning angle θ from the initial stop position to the reverse start position, the predicted parking position can be moved along the sideways direction of the target parking space T. Therefore, if the predicted parking positions are displayed by the vehicle marks for each of the reverse start positions, then the driver can adjust the reverse start position such that the vehicle mark is located in the substantial center of the target parking space T, so that as a result of subsequent rearward movement, the vehicle 1 is guided to the center of the target parking space T.

Figure 19:
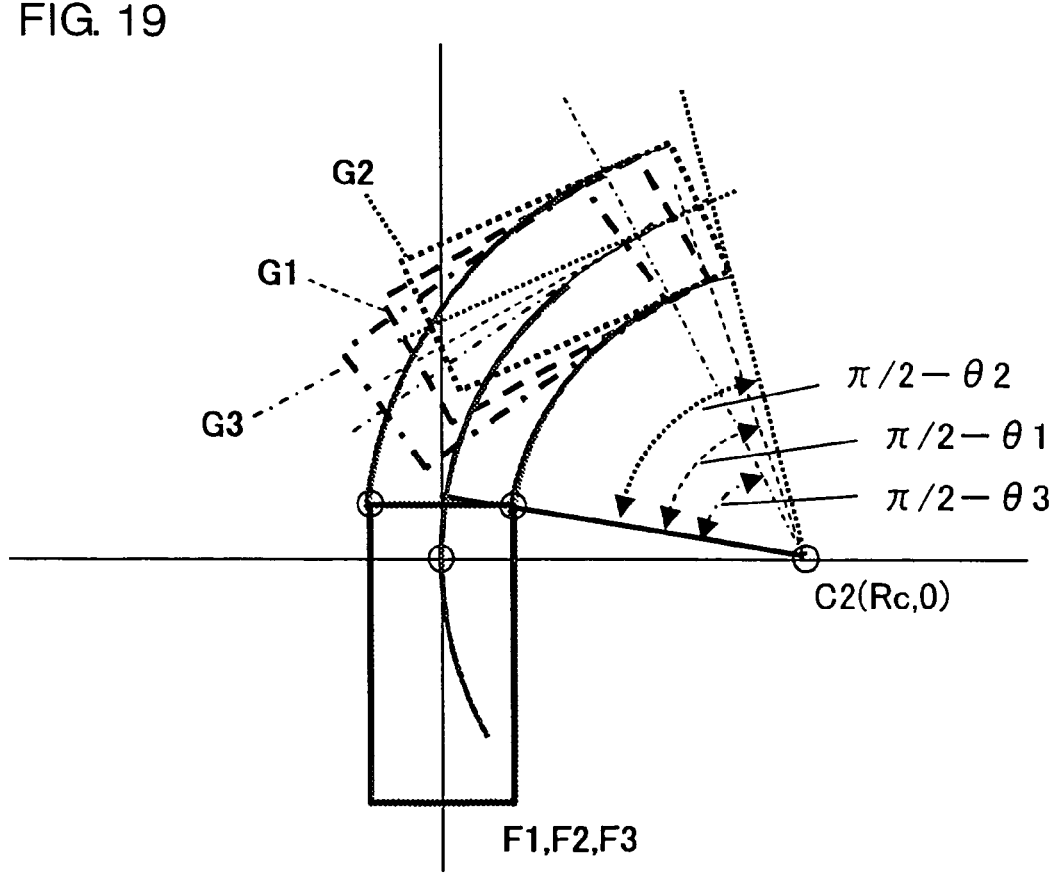
FIG. 19 is a diagram showing how the predicted parking position is plotted when performing in-parallel parking in accordance with Embodiment 8.

If θ1, θ2, and θ3 are established as the turning angles at each of the vehicle positions F1, F2, and F3 which are the reverse start positions from the vehicle position E1, then, as shown in FIG. 19, the turning angles for moving the vehicle to the vehicle positions G1, G2, and G3 which are the predicted parking positions from the reverse start positions will be π/2-θ1, π/2-θ2, and π/2-θ3, respectively. The same method as explained in Embodiment 1 can be used to plot the predicted parking positions and the predicted paths predicted from the initial stop position.

However, the turning angle θ changes as the vehicle advances from the vehicle position E1 to the reverse start position. Therefore, plotting is continuously conducted in accordance with change of the angle θ.

Further, similarly to when performing in-line parking, the vehicle marks showing the predicted parking positions and the predicted paths may be displayed at appropriate timings after the vehicle 1 starts to advance from the vehicle position E1, e.g., when the actual turning angle of the vehicle 1 exceeds a predetermined value.

Embodiment 9

When performing in-parallel parking in accordance with the above-mentioned Embodiment 8, the guidance began to be provided after stopping at the initial stop position at the angle perpendicular to the target parking space T. However, in Embodiment 9, it is not necessary to stop at the initial stop position. Rather, the vehicle 1 advances to the proximity of the vehicle position F1 which is the reverse start position, and then the rear view image and the predicted path are displayed onto the monitor 4, and in-parallel parking is performed.

The driver moves the vehicle 1 forward to go past the side of the target parking space T, and then steers the steering wheel 7 in such direction as to move the vehicle away from the target parking space T, and stops the vehicle 1 after advancing to a reverse start position with somewhat angle to the target parking space T.

Here, when the driver turns on the in-parallel mode switch 10, the controller 8 calculates the predicted paths P1 and P2 showing both side portions of the vehicle 1 in the case where the steering angle of the steering wheel 7 is the maximum and the vehicle is moved backward, and displays those predicted paths P1 and P2 onto the screen 4 of the monitor 15 together with the image behind the vehicle. Those predicted paths P1 and P2 are plotted by, for example, segments at an angle of 60°.

Figure 20A:
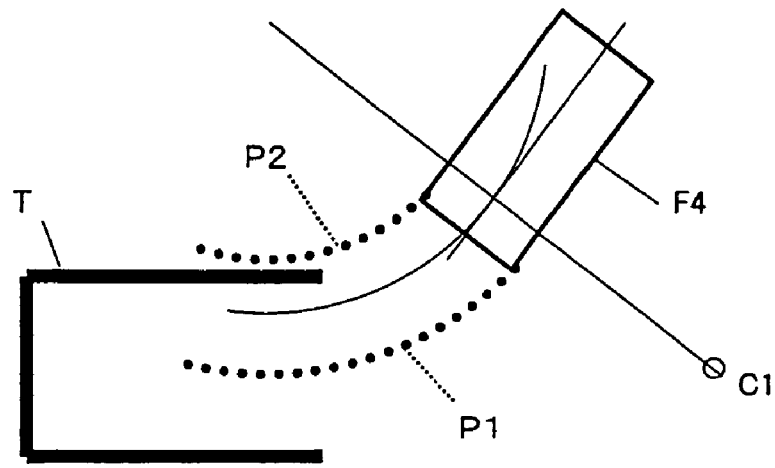
FIGS. 20A to 20C are diagrams showing positions and predicted paths of the vehicle when performing in-parallel parking in accordance with Embodiment 9.
Figure 20B:
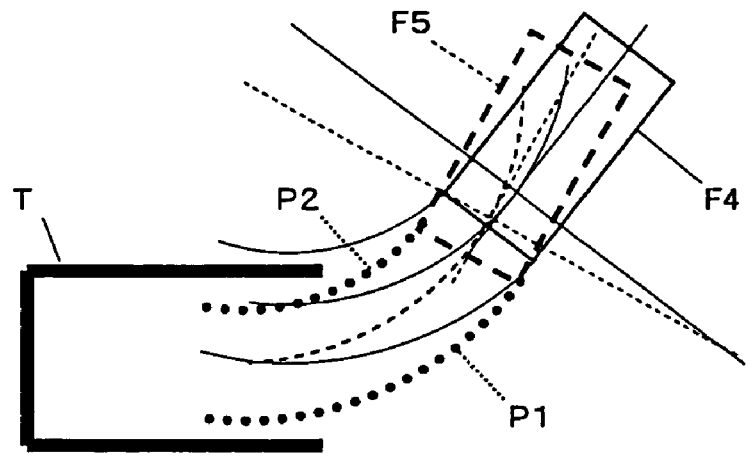

At this time, for example, as shown in FIG. 20A, when the driver drives the vehicle past the position F1 which is the normal calculated reverse start position and stop at the position F4 and turns on the in-parallel mode switch 10, the predicted paths P1 an P2 will not be able to fit inside the target parking space T. Therefore, the driver slowly moves the vehicle backward from the position F4 and stops the vehicle at the position F5 where the predicted paths P1 and P2 are within the target parking space T, as shown in FIG. 20B.

Figure 20C:
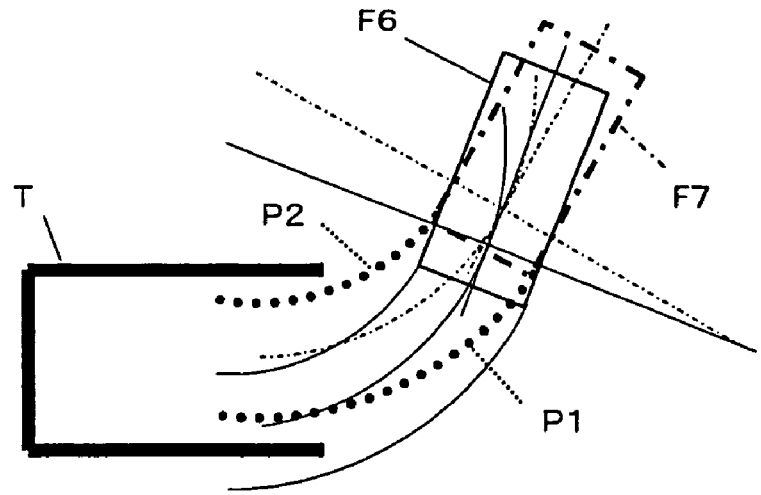

On the other hand, as shown in FIG. 20C, even if the driver stops at the position F6 immediately before the position F1 which is the normal calculated reverse start position and turns on the in-parallel mode switch 10 at that location, the predicted paths P1 and P2 will not fit inside the target parking space T. Therefore, the driver slowly advances forward from the position F6 and stops at the position F7 where the predicted paths P1 and P2 fit inside the target parking space T.

In this way, once the driver stops at the position where the predicted paths P1 and P2 are inside the target parking space T, a "Next Step" switch is operated, and guidance will be given for the driver to turn the steering wheel 7 into the maximum in the opposite direction and backup the vehicle 1. Here, the driver turns the steering wheel 7 in the same direction as the steering direction plotted by the predicted paths P1 and P2, in FIGS. 20B and 20C the steering wheel is turned completely to the left, and the vehicle is slowly reversed, whereby the vehicle 1 can be guided into the target parking space T.

The turning angle at the final turn for guiding the vehicle 1 into the target parking space T is not determined. However, when the vehicle 1 is backed up at for example 50°, it is desirable that a "pong" sound be emitted to inform the driver that the turn completion position has been approached. Here, the controller 8 displays a straight backward path as shown in FIG. 3A. When the vehicle 1 reaches the position that is at the substantial center of the width of the target parking space T and parallel to it, the driver puts the steering wheel 7 into the straight-forward position, and views the target parking space T and the straight backward path, which are inside the rear view image on the monitor 4, while moving the vehicle 1 backward, and then stops the vehicle 1 straight inside the target parking space T to complete the in-parallel parking.

Note that, instead of the "Next Step" switch operation, the yaw rate sensor 9 can detect that there is not change in the vehicle 1 angle for a given duration of time, to judge that the driver has stopped the vehicle 1 and is currently steering. Then the controller 8 may begin giving guidance.

Further, the necessary curve directions of predicted paths P1 and P2 are determined depending on whether the vehicle 1 is turning left or right to perform the in-parallel parking. The discrimination between left and right can be performed as follows. Namely, the yaw rate sensor 9 constantly measures the angular speed of the vehicle 1, and for a given duration e.g. several seconds this is held as the vehicle 1 turning angle is updated. Then, the vehicle 1 turning angle (direction) immediately before the in-parallel mode switch 10 is turned on is determined. If the turning direction is to the right side, then the predicted path turning to the left is displayed. If the turning direction is to the left side, then the predicted path turning to the right is displayed. In this case, if the updating of the turning angle is only performed when the angular speed of the vehicle 1 exceeds a given value, then the previous turn data is not deleted, even if time elapses from when the vehicle 1 stops until the time when the in-parallel mode switch 10 is turned on.

Note that, in the above-mentioned Embodiments 1 to 9, the yaw rate sensor 9 detects the turn angle of the vehicle 1, and the approach information and the arrival information were outputted to the driver accordingly. However, instead of this configuration, if the vehicle 1 is moved forward such that the vehicle mark 21 displayed on the screen 15 overlaps with the parking space T in the image, then the vehicle 1 can be parked into the parking space T, even if the yaw rate sensor 9 or other yaw angle detecting means is not provided.

Further, in each of the above-mentioned embodiments, in-line parking or in-parallel parking was performed either to the left or to the right side. However, the present invention can also be applied similarly when parking on the opposite side.

Note that, when the predicted path 14 and the vehicle mark are actually displayed in an overlapping manner on the monitor 4 together with the image behind the vehicle 1 as when performing the in-line parking and the in-parallel parking shown in the above-mentioned Embodiments 1 to 9, it is desirable to perform processing to change the mirror, change the camera perspective, correct lens distortion, etc. Further, when displaying the predicted path, the display should be made such that an actual vehicle width of 1.8 m is displayed as 2.2 m to provide some leeway, to decrease the danger of interfering with obstructions in the actual operations.

Further, in each of the above-mentioned embodiments, the predicted paths 14, 25 and the vehicle mark 21 were calculated. However, they may also be set in advance in the controller 8.

Furthermore, in the above-mentioned Embodiments 1 to 9, the vehicle mark indicating the predicted parking position, and the predicted path, were expressed by line drawings using solid lines and dotted lines. However, in addition to these, the given areas can be filled in or be made partially transparent.

Further, in each of the above-mentioned embodiments, the predicted path was expressed as the paths traveled by the left and right ends of the rear bumper. However, the invention is not restricted to this configuration. Rather, the predicted path may include the paths of the left and right ends of the front bumper, for example. In the case where the predicted path is expressed as an area, it is possible to express the outer form of the path traveled by surface of the shape of the vehicle. In such a case, the driver can confirm the presence/absence of not only interference with the back end of the vehicle, but also of interference with all portions.

As explained above, in accordance with the present invention, when performing operations to park the vehicle in accordance with the guidance information, in order for the driver to be able to confirm the possibility of parking in the target parking space by continuing the driving operations instructed by the guidance information, at least one of either the predicted path or the predicted parking position is displayed on the monitor, overlapping the image from the image capturing unit. As a result, confirmation can be made in advance regarding whether or not it is possible to park in the parking space by performing the parking operations according to the guidance information.

What is claimed is:

1. A parking assisting device with which a driver parks a vehicle into a target parking space by performing driving operations in accordance with guidance information, comprising:

image capturing means for capturing at least an image behind the vehicle;

a monitor arranged near a driver seat of the vehicle for displaying the image obtained by the image capturing means;

yaw angle detecting means for detecting a yaw angle of the vehicle;

guiding means for outputting the guidance information regarding the driving operations to the driver; and a controller for comparing a pre-set prescribed yaw angle corresponding to a predetermined vehicle position with the yaw angle of the vehicle detected by the yaw angle detecting means to identify a current position of the vehicle, providing the guidance information for guiding a predetermined parking path to the target parking space by driving the vehicle while maintaining a predetermined steering angle via the guiding means, and displaying on the monitor at least one of a predetermined predicted path and a predetermined predicted parking position on the parking path guided by the guidance information so as to overlap the image obtained by the image capturing means to enable the driver to confirm whether or not the vehicle can be parked into the target parking space by continuing the driving operations in accordance with the guidance information, the predetermined predicted path and the predetermined predicted parking position being available by the controller in advance of when the driver operates the vehicle in accordance with the guidance system.

2. A parking assisting device according to claim 1, wherein the controller calculates at least one of the predicted path and the predicted parking position of the vehicle to display it on the monitor when the driver operates the vehicle in accordance with the guidance information.

3. A parking assisting device according to claim 1, wherein the controller displays at least one of the predicted path and the predicted parking position of the vehicle, both being set in advance, when the driver operates the vehicle in accordance with the guidance information.

4. A parking assisting device according to claim 1, wherein the controller gradually moves the display of at least one of the predicted path and the predicted parking position on the monitor such that the display of at least one of the predicted path and the predicted parking position is always at the same position with respect to the image obtained by the image capturing means in accordance with a vehicle movement.

5. A parking assisting device according to claim 1, further comprising predicted parking position display moving means for moving a display of the predicted parking position to the target parking space in the image obtained by the image capturing means on the screen of the monitor, through an operation conducted by the driver, the controller updating the prescribed yaw angle based on a movement amount of the display of the predicted parking position which is moved by the predicted parking position display moving means and comparing the updated prescribed yaw angle with the yaw angle detected by the yaw angle detecting means to identify the current position of the vehicle and to provide the guidance information for parking assistance.

6. A parking assisting device according to claim 5, further comprising movement amount storing means for storing the movement amount of the display of the predicted parking position which is moved by the predicted parking position display moving means, the controller displaying at least one of the predicted path and the predicted parking position based on the stored movement amount.

7. A parking assisting device according to claim 1, further comprising predicted parking position selection means for selecting the predicted parking position closest to the target parking space in the image from among a plurality of predicted parking positions displayed on the monitor through an operation conducted by the driver, the controller displaying the plurality of predicted parking positions on the monitor at slightly different positions from each other, updating the prescribed yaw angle based on the predicted parking position selected by the predicted parking position selection means, and comparing the updated prescribed yaw angle with the yaw angle detected by the yaw angle detecting means to identify the current position of the vehicle and to provide the guidance information for parking assistance.

8. A parking assisting device according to claim 1, wherein, the controller displays at least one of the predicted path and the predicted parking position on the monitor so as to overlap with the image obtained by the image capturing means from a time when parking assistance using the guidance information is started.

9. A parking assisting device according to claim 1, wherein, the controller displays at least one of the predicted path and the predicted parking position on the monitor so as to overlap with the image obtained by the image capturing means from a time when the vehicle advances while maintaining a predetermined steering angle to reach a position where a reverse movement is started after parking assistance using the guidance information is started.

10. A parking assisting device according to claim 1, wherein:

the controller displays at least one of the predicted path and the predicted parking position on the monitor so as to overlap with the image obtained by the image capturing means before parking assistance using the guidance information is started, and the vehicle is stopped based on a degree of overlapping of at least one of the displayed predicted path and the displayed predicted parking position with the target parking space in the image to be guided to a position where parking assistance using the guidance information is to be started.

11. A parking assisting device according to claim 10, wherein, the controller provides the guidance information for parking the vehicle by advancing the vehicle from the position where the parking assistance is started while maintaining a predetermined steering angle, steering the vehicle in an opposite direction with the vehicle being stopped, and driving the vehicle backward while maintaining the predetermined steering angle.

12. A parking assisting device according to claim 10, wherein the controller provides the guidance information for parking the vehicle by driving the vehicle backward from the position where the parking assistance is started while maintaining the predetermined steering angle.

13. A parking assisting device according to claim 1, wherein the controller provides the guidance information for parking the vehicle by advancing the vehicle while maintaining a predetermined steering angle to reach a position where a reverse movement is started, steering the vehicle in an opposite direction with the vehicle being stopped and driving the vehicle backward while maintaining the predetermined steering angle.

14. A parking assisting device according to claim 13, wherein:

the controller calculates at least one of the predicted path and the predicted parking position in the case where parking operations are conducted after parking assistance in accordance with the guidance information is started and before the vehicle reaches a position where a reverse movement is started, and displays at least one of the calculated predicted path and the calculated predicted parking position onto the monitor so as to overlap with the image obtained by the image capturing means, the vehicle is stopped based on a degree of overlapping of at least one of the displayed predicted path and the displayed predicted parking position with the target parking space in the image to be guided to the position where the reverse movement is to be started.

15. A parking assisting device according to claim 1, wherein the image capturing means includes rear view image capturing means for capturing the image behind the vehicle and side image capturing means for capturing an image on a side of the vehicle.

* * * * *

UNITED STATES PATENT AND TRADEMARK OFFICE
CERTIFICATE OF CORRECTION

PATENT NO. : 7,257,486 B2
APPLICATION NO. : 10/733497
DATED : August 14, 2007
INVENTOR(S) : Shimizaki et al.

It is certified that error appears in the above-identified patent and that said Letters Patent is hereby corrected as shown below:

On the title page, Item (57) in the Abstract,

Line 15, please delete "in target parking space" and insert therefore -- in a target parking space --;

Column 2, line 14, please delete "monitor of when" and insert therefore -- monitor when --;

Column 5, line 23, please delete "C3y = C4y - (Rc+Rc)" and insert therefore -- C3y = C4y + (Rc+Rc) --;

Column 5, line 25, please delete "J0 of the vehicle" and insert therefore -- JO of the vehicle --;

Column 8, line 62, please delete "C2y = -(Rc+Rc)" and insert therefore -- C2y = (Rc+Rc) --;

Column 9, line 3, please delete "turning Φ" and insert therefore -- turning angle Φ --;

Column 10, line 26, please delete "vehicle 1 to be" and insert therefore -- vehicle 1 is to be --;

Column 12, line 22, please delete "rear-fight" and insert therefore -- rear-right --;

Column 14, line 26, please delete "J0x, J0y of the rear axle center J0" and insert therefore -- JOx, JOy of the rear axle center JO --;

Column 14, line 27, please delete "(J0x+dx, J0y+dy)" and insert therefore -- (JOx+dx, JOy+dy) --;

Column 14, line 28, please delete "J0'" and insert therefore -- JO' --;

Column 15, line 16, please delete "radius is the" and insert therefore -- radius is to be the --;

UNITED STATES PATENT AND TRADEMARK OFFICE
CERTIFICATE OF CORRECTION

PATENT NO.       : 7,257,486 B2
APPLICATION NO.  : 10/733497
DATED            : August 14, 2007
INVENTOR(S)      : Shimizaki et al.

It is certified that error appears in the above-identified patent and that said Letters Patent is hereby corrected as shown below:

Column 15, line 17, please delete "radius to be Rc" and insert therefore -- radius Rc --;

Column 15, line 46, please delete "most the" and insert therefore -- most of the --;

Column 15, line 67, please delete "parking position" and insert therefore -- parking positions --;

Column 17, line 41, please delete "to reach at the" and insert therefore -- to reach the --;

Column 17, line 50, please delete "making the controller" and insert therefore -- turning the controller --;

Column 17, line 57, please delete "α and β." and insert therefore -- α and β: --;

Column 17, line 62, please delete "(J0x', J0y')" and insert therefore -- (JOx', JOy') --;

Column 17, line 63, please delete "center J0" and insert therefore -- center JO --;

Column 17, line 65, please delete "β+Δβ." and insert therefore -- β+Δβ: --;

Column 18, line 5, please delete "J0y'" and insert therefore -- JOy' --;

Column 18, line 6, please delete "J0y'" and insert therefore -- JOy' --;

Column 18, line 7, please delete "J0x'" and insert therefore -- JOx' --;

Column 18, line 15, please delete "(-J0x, -J0y)" and insert therefore -- (-JOx, -JOy) --;

UNITED STATES PATENT AND TRADEMARK OFFICE
CERTIFICATE OF CORRECTION

PATENT NO. : 7,257,486 B2
APPLICATION NO. : 10/733497
DATED : August 14, 2007
INVENTOR(S) : Shimizaki et al.

It is certified that error appears in the above-identified patent and that said Letters Patent is hereby corrected as shown below:

Column 18, line 34, please delete "J0x'" and insert therefore -- JOx' --;

Column 18, line 35, please delete "position M3." and insert therefore -- position M3: --;

Column 18, lines 53-54, please delete "1 when appropriately" and insert therefore -- 1 appropriately --;

Column 20, line 17, please delete "with somewhat" and insert therefore -- with a somewhat --;

Column 20, line 30, please delete "and stop at" and insert therefore --and stops at --;

Column 20, line 32, please delete "P1 an P2" and insert therefore -- P1 and P2 --;

Column 21, line 7, please delete "there is not change" and insert therefore -- there is no change --;

Column 21, line 17, please delete "e.g. several seconds this is held as" and insert therefore -- e.g. several seconds, this is held, as --.

Signed and Sealed this

Third Day of November, 2009

David J. Kappos
*Director of the United States Patent and Trademark Office*